United States Patent [19]
Abrahamsen et al.

[11] Patent Number: 6,056,060
[45] Date of Patent: May 2, 2000

[54] COMPENSATOR SYSTEM FOR WELLBORE TUBULARS

[75] Inventors: Egill Abrahamsen, Katy; Stephen L. Albright, Houston, both of Tex.; Jimmy L. Hollingsworth, Jr., Langenhagen, Germany; Jean D. Bearb, McAllen; Frederick M. Leicht, Cypress, both of Tex.; Michael Hayes, Lafayette, La.; John Birdwell, Liberty, Tex.; Leendert Spreij, Etten-Leur, Netherlands

[73] Assignee: Weatherford/Lamb, Inc., Houston, Tex.

[21] Appl. No.: 09/076,507

[22] Filed: May 12, 1998

Related U.S. Application Data

[63] Continuation-in-part of application No. 09/036,271, Mar. 6, 1998, which is a continuation-in-part of application No. 08/998,461, Dec. 26, 1997, which is a continuation-in-part of application No. 08/706,983, Aug. 19, 1996.

[51] Int. Cl.$^7$ ........................................... E21B 15/00
[52] U.S. Cl. ..................... 166/380; 166/77.51; 175/85; 414/22.51
[58] Field of Search ............................. 166/77.51, 77.52, 166/77.53, 85.1; 175/85; 414/22.51

[56] References Cited

U.S. PATENT DOCUMENTS

| | | |
|---|---|---|
| 1,454,194 | 5/1923 | Thomas . |
| 1,842,638 | 1/1932 | Wigle . |
| 1,844,379 | 2/1932 | Campbell . |
| 1,891,832 | 12/1932 | Parks . |
| 2,488,107 | 11/1949 | Abegg . |

(List continued on next page.)

FOREIGN PATENT DOCUMENTS

| | | |
|---|---|---|
| 1239634 | of 1984 | Canada . |
| 0 171 144 | 7/1984 | European Pat. Off. . |
| 0171144A | 2/1986 | European Pat. Off. . |
| 0 202 184 | 3/1986 | European Pat. Off. . |
| 1497666A | 10/1967 | France . |
| 1 455 509 | 11/1976 | United Kingdom . |
| PCT/GB80/00196 | of 1980 | WIPO . |

OTHER PUBLICATIONS

LaFleur Petroleum Services, Inc. Autoseal Circulating Head, 1992.
BJ Oilfield Products And Systems, BJ Hughes 1986, pp. 37, 42, 46, 49, 51, 53, 54, 55.
AZ Lifting Subs, A–Z Int'l Co., 1 p. 1974.
Oilfield Services and Manufactured Products, p. 19, HOMOCO, 1984.
"Joy Web Wilson Hydra Hooks," Joy Petroleum Equip., 1982.
"Web Wilson Return–A–Matic Hooks," Joy Petroleum Equip., 1975.
"Model 14.5–50, Hydraulic Power Tong,"Weatherford, 1993, pp. § 1, 1, 6; § 2, 4, 5, 6; § 3, 4; § 8, 29.
Int'l Search Report for application PCT/GB97/02274, filed Aug. 26, 1997, counterpart of this case Ser. No. U.S. 08/706,983.
Int'l Search Report PCT/EP 98/08580 Counterpart of this U.S. case.

*Primary Examiner*—William Neuder
*Attorney, Agent, or Firm*—Guy McClung

[57] ABSTRACT

A new joint compensator and systems with it and methods of their use have been invented which, in one aspect, includes a compensator system for compensating for the weight of at least one joint, which is a wellbore tubular member, the compensating system for use below a wellbore apparatus, the wellbore apparatus for supporting the at least one joint, the compensation system having a joint compensator suspended below the wellbore apparatus and connected thereto for selectively compensating for the weight of the at least one joint, a lower elevator suspended below and interconnected with the joint compensator for releasably holding the at least one joint, and a wellbore elevator connected to the wellbore apparatus for selectively supporting the joint compensator and the at least one joint.

23 Claims, 27 Drawing Sheets

U.S. PATENT DOCUMENTS

| | | |
|---|---|---|
| 2,622,916 | 12/1952 | Libin et al. . |
| 2,661,979 | 12/1953 | Stone . |
| 2,712,932 | 7/1955 | Gould .......................................... 267/70 |
| 3,037,803 | 6/1962 | Phillips . |
| 3,140,523 | 7/1964 | Taylor, Jr. . |
| 3,193,116 | 7/1965 | Kenneday et al. . |
| 3,194,313 | 7/1965 | Fanshawe . |
| 3,351,372 | 11/1967 | Marks et al. .............................. 294/81 |
| 3,857,450 | 12/1974 | Guier ........................................ 175/85 |
| 4,117,941 | 10/1978 | McCleskey, Jr. et al. ............... 214/2.5 |
| 4,128,888 | 12/1978 | Sheldon et al. ......................... 364/565 |
| 4,421,179 | 12/1983 | Boyadjieff ................................ 173/44 |
| 4,449,596 | 5/1984 | Boyadjieff ................................ 175/85 |
| 4,529,045 | 7/1985 | Boyadjieff ............................... 176/164 |
| 4,582,133 | 4/1986 | Tambs ................................... 166/77.5 |
| 4,605,077 | 8/1986 | Boyadjieff ................................ 175/85 |
| 4,610,315 | 9/1986 | Koga et al. ............................... 175/85 |
| 4,621,974 | 11/1986 | Krueger ................................... 414/786 |
| 4,652,195 | 3/1987 | McArthur .................................. 414/22 |
| 4,681,158 | 7/1987 | Pennison ................................. 166/77.5 |
| 4,753,300 | 6/1988 | Shaw et al. .............................. 173/164 |
| 4,800,968 | 1/1989 | Shaw et al. ............................... 175/85 |
| 4,813,498 | 3/1989 | Lynch et al. ............................. 175/113 |
| 4,921,386 | 5/1990 | McArthur .............................. 414/22.51 |
| 5,049,020 | 9/1991 | McArthur .............................. 414/22.51 |
| 5,062,756 | 11/1991 | McArthur et al. .................... 414/22.51 |
| 5,390,568 | 2/1995 | Pietras .................................... 81/57.16 |
| 5,577,566 | 11/1996 | Albright et al. ........................ 175/321 |
| 5,645,131 | 7/1997 | Trevisani ............................... 166/77.53 |
| 5,664,310 | 9/1997 | Penisson ............................... 29/407.02 |
| 5,755,289 | 5/1998 | Angman et al. ........................ 116/378 |
| 5,755,296 | 5/1998 | Richardson et al. ..................... 175/162 |
| 5,791,410 | 8/1998 | Castille et al. .......................... 166/77.1 |
| 5,850,877 | 12/1998 | Albright et al. ...................... 166/77.51 |

FIG. 4

| A | B | C | D | E |
|---|---|---|---|---|
| Lbs/ft | Weight | Neutral | PSI Make | PSI Break |
| 17 | 680 | 9 | 5 | 10 |
| 20 | 800 | 11 | 6 | 12 |
| 23 | 920 | 12 | 7 | 13 |
| 24 | 960 | 13 | 8 | 14 |
| 26 | 1040 | 14 | 8 | 15 |
| 26.4 | 1056 | 14 | 8 | 15 |
| 28 | 1120 | 15 | 9 | 16 |
| 32 | 1280 | 17 | 10 | 18 |
| 32.3 | 1292 | 17 | 10 | 19 |
| 32.75 | 1310 | 17 | 10 | 19 |
| 36 | 1440 | 19 | 11 | 21 |
| 40 | 1600 | 21 | 13 | 23 |
| 40.5 | 1620 | 21 | 13 | 23 |
| 42 | 1680 | 22 | 13 | 24 |
| 45.5 | 1820 | 24 | 14 | 26 |
| 47 | 1880 | 25 | 15 | 27 |
| 48 | 1920 | 25 | 15 | 28 |
| 51 | 2040 | 27 | 16 | 29 |
| 54 | 2180 | 28 | 17 | 31 |
| 54.5 | 2180 | 29 | 17 | 31 |
| 55.5 | 2220 | 29 | 17 | 32 |
| 60 | 2400 | 32 | 19 | 35 |
| 61 | 2440 | 32 | 19 | 35 |
| 65 | 2600 | 34 | 20 | 38 |
| 68 | 2720 | 35 | 21 | 39 |
| 72 | 2880 | 38 | 23 | 42 |
| 75 | 3000 | 39 | 24 | 43 |
| 84 | 3360 | 44 | 26 | 49 |
| 87.5 | 3500 | 46 | 28 | 51 |
| 94 | 3760 | 49 | 30 | 54 |
| 106.5 | 4280 | 56 | 34 | 62 |
| 133 | 5320 | 70 | 42 | 77 |
| 150 | 6000 | 79 | 47 | 87 |

| A | B | C | D | E |
|---|---|---|---|---|
| Lbs/ft | Weight | Neutral | PSI Make | PSI Break |
| 2.6 | 78 | 12 | 7 | 14 |
| 4 | 120 | 19 | 11 | 21 |
| 4.6 | 138 | 22 | 13 | 24 |
| 4.7 | 141 | 22 | 13 | 25 |
| 5.8 | 174 | 28 | 17 | 30 |
| 5.95 | 179 | 28 | 17 | 31 |
| 6.4 | 192 | 31 | 18 | 34 |
| 6.5 | 195 | 31 | 19 | 34 |
| 7.7 | 231 | 37 | 22 | 40 |
| 7.8 | 234 | 37 | 22 | 41 |
| 7.9 | 237 | 38 | 23 | 42 |
| 8.6 | 258 | 41 | 25 | 45 |
| 8.7 | 261 | 42 | 25 | 46 |
| 9.2 | 276 | 44 | 26 | 48 |
| 9.3 | 279 | 44 | 27 | 49 |
| 9.5 | 285 | 45 | 27 | 50 |
| 10.2 | 306 | 49 | 29 | 54 |
| 11 | 330 | 53 | 32 | 58 |
| 12.7 | 381 | 61 | 36 | 67 |
| 12.75 | 383 | 61 | 37 | 67 |
| 12.95 | 389 | 62 | 37 | 68 |
| 15.5 | 465 | 74 | 44 | 81 |

FIG. 5

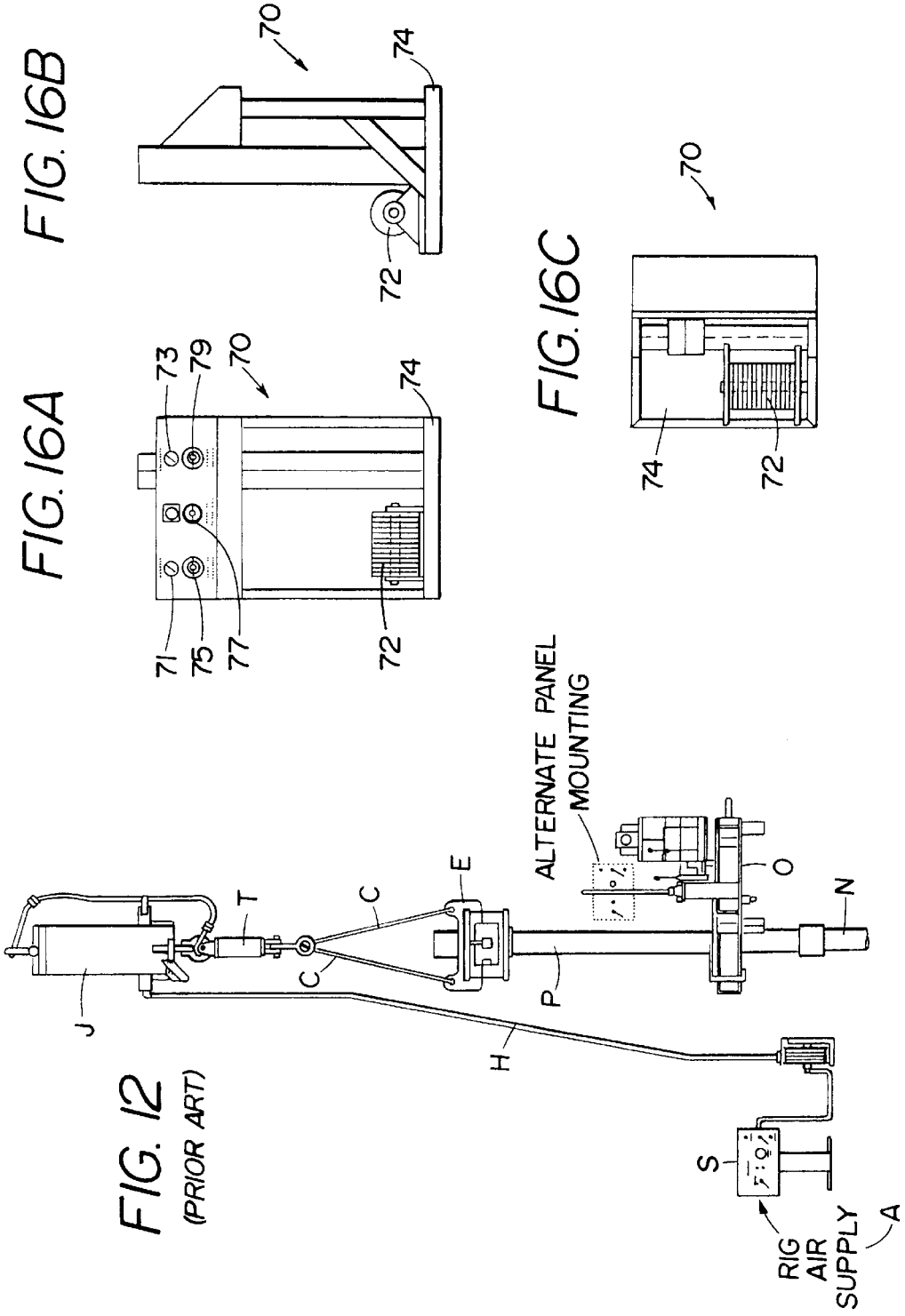

FIG. 15B
FIG. 15A
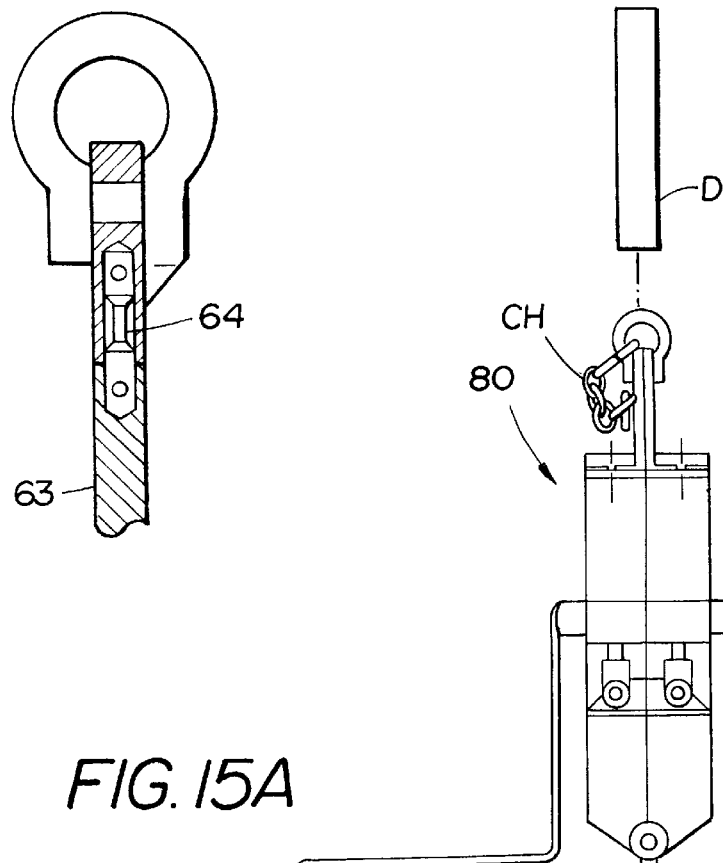
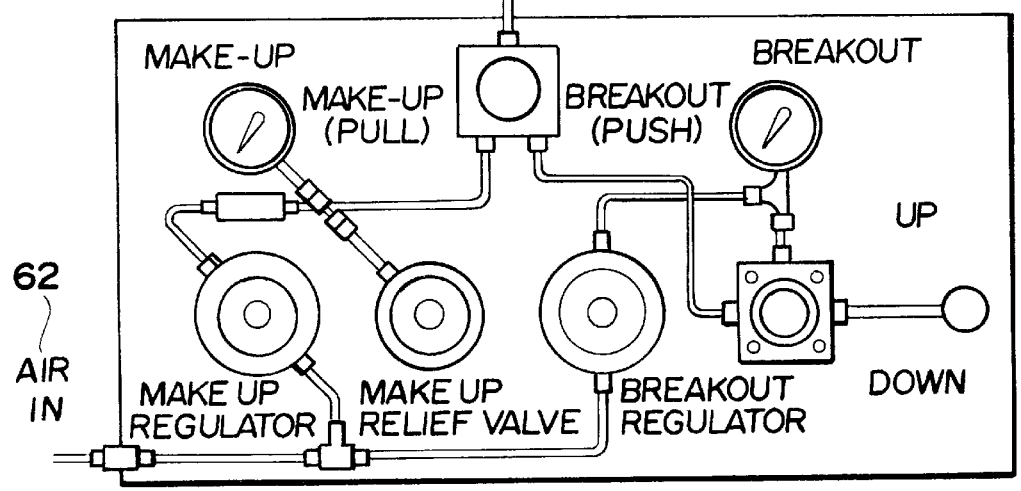

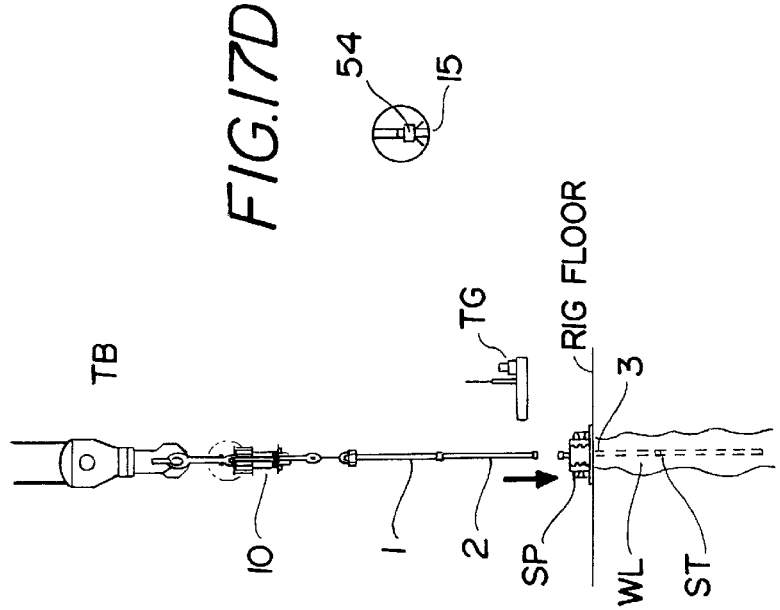
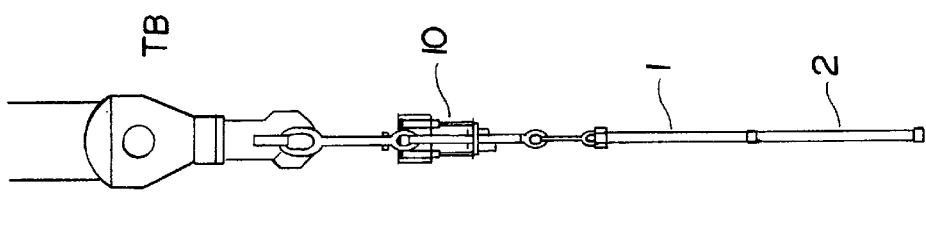
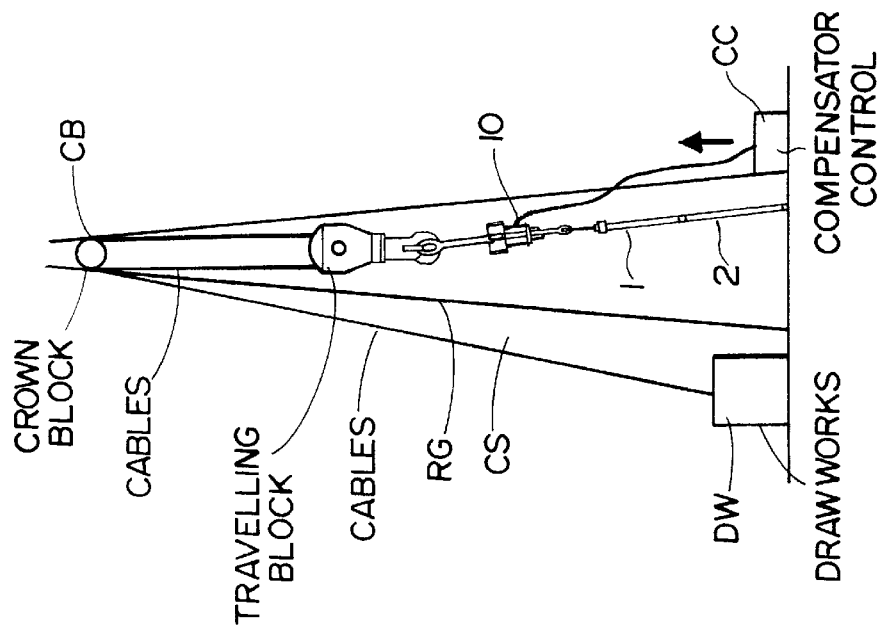

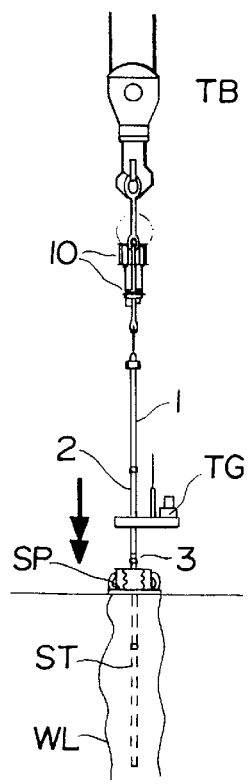
FIG.17E
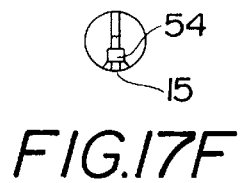
FIG.17F
FIG.17H
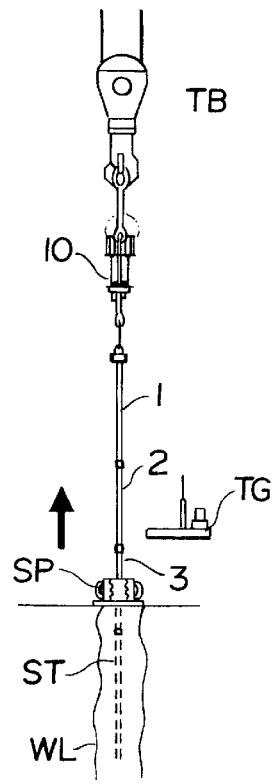
FIG.17G
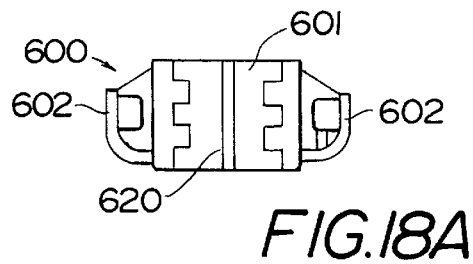
FIG.18A
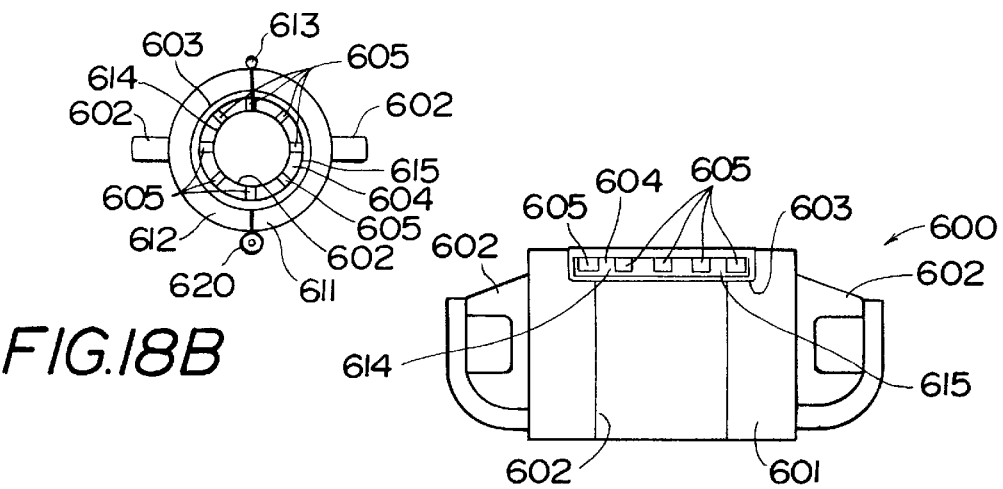
FIG.18B
FIG.18C FIG.19D
FIG.19E
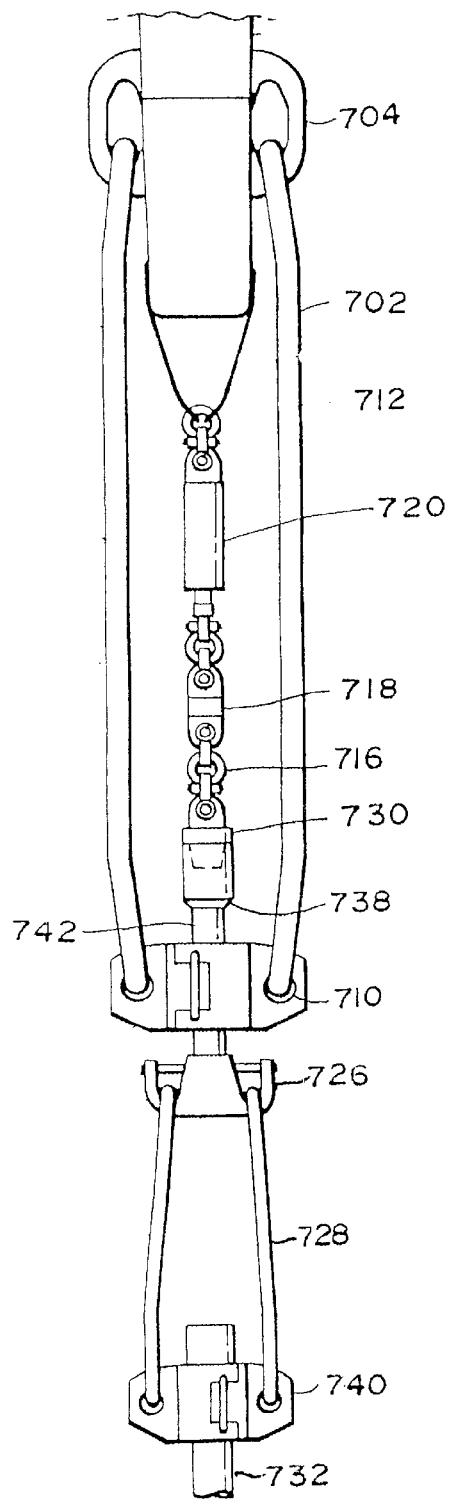
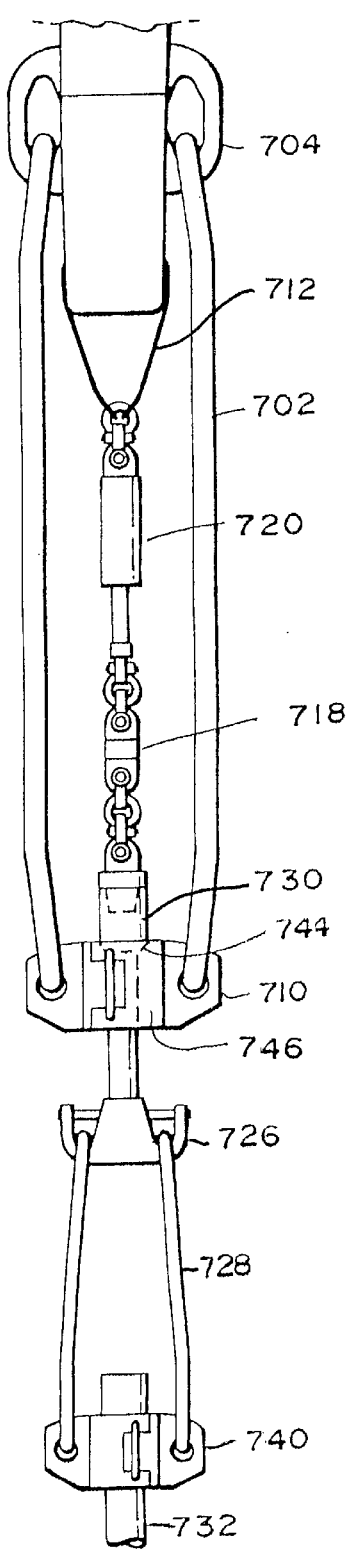

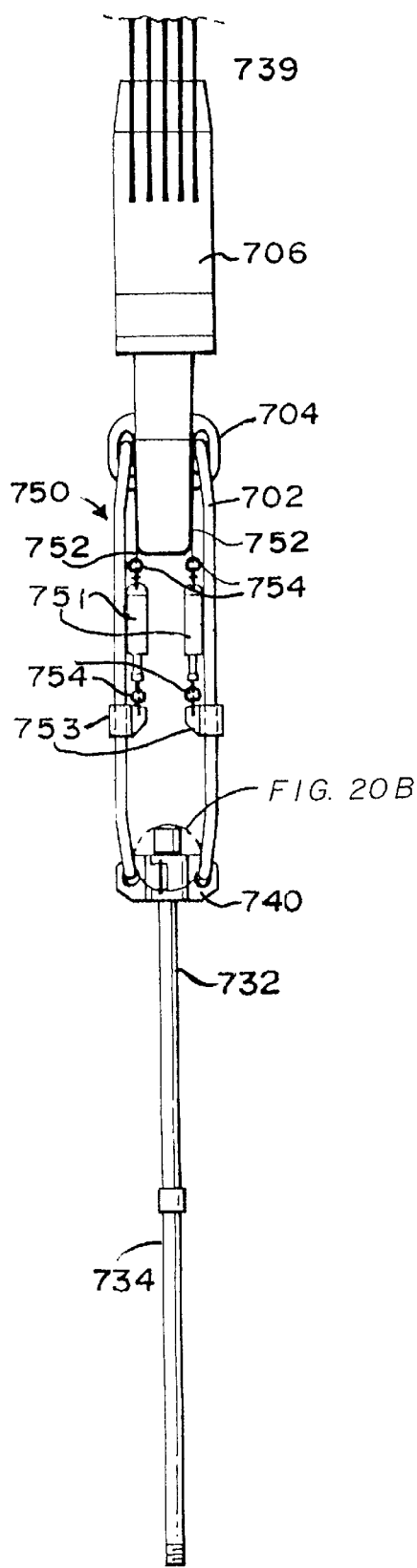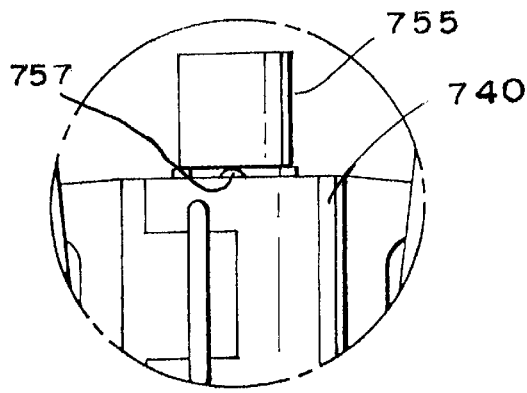

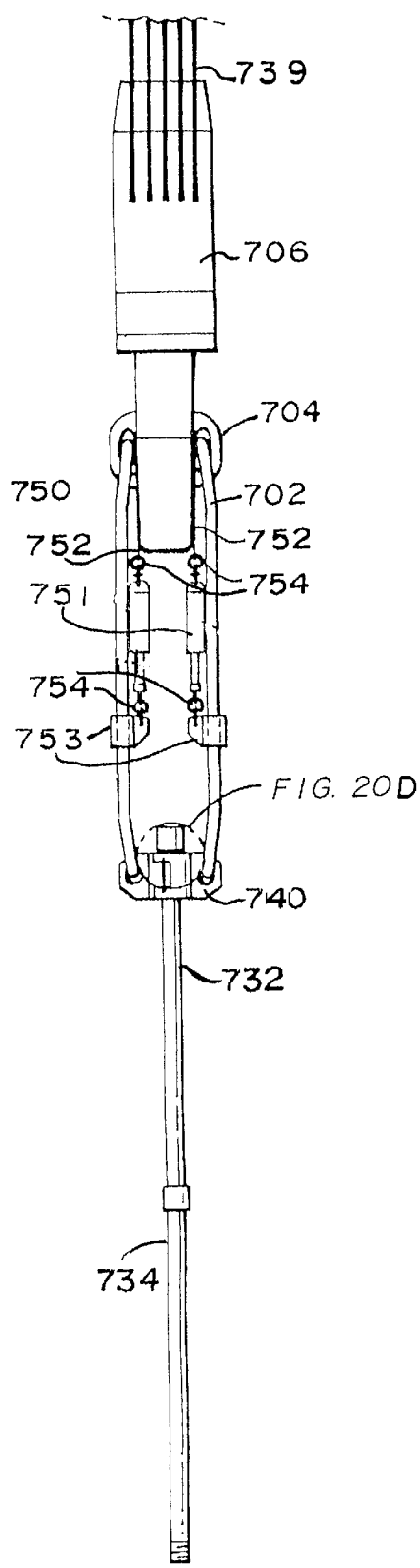
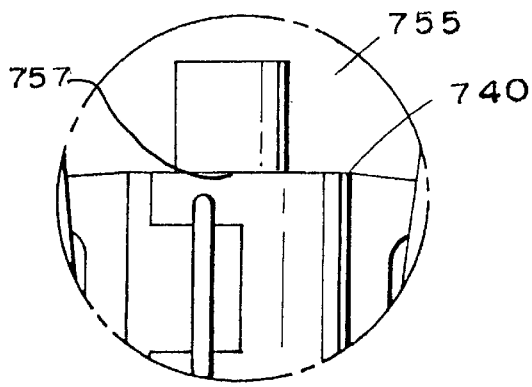

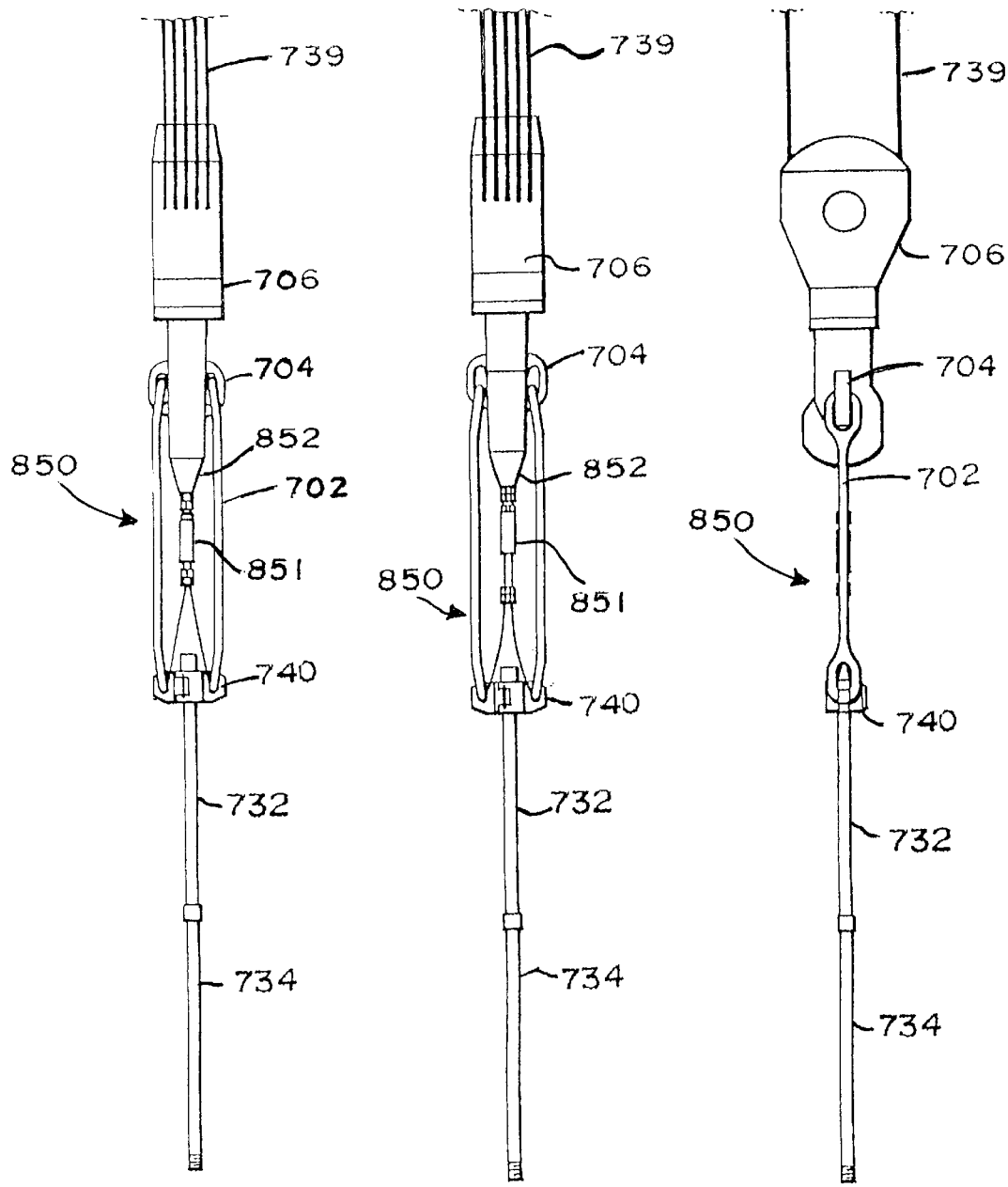

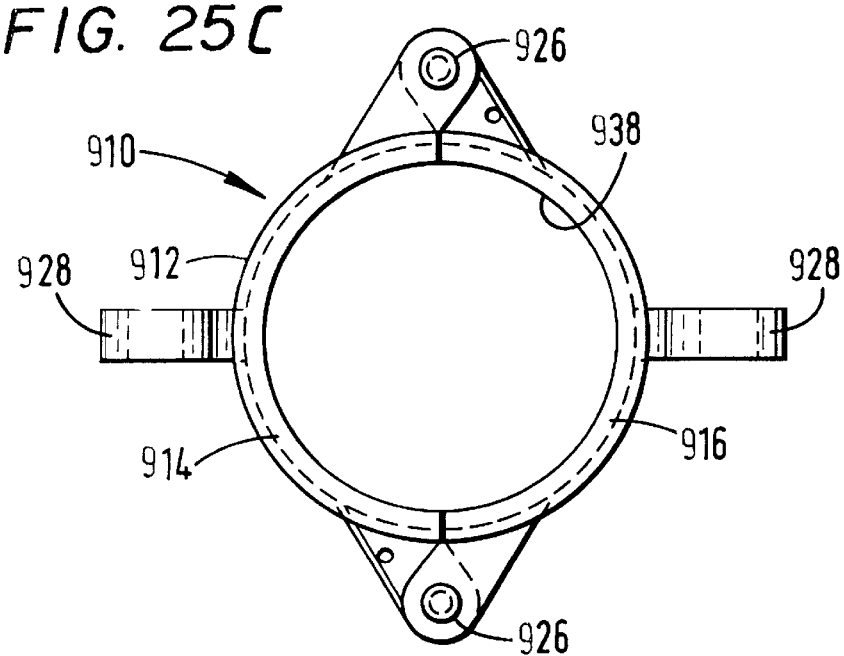
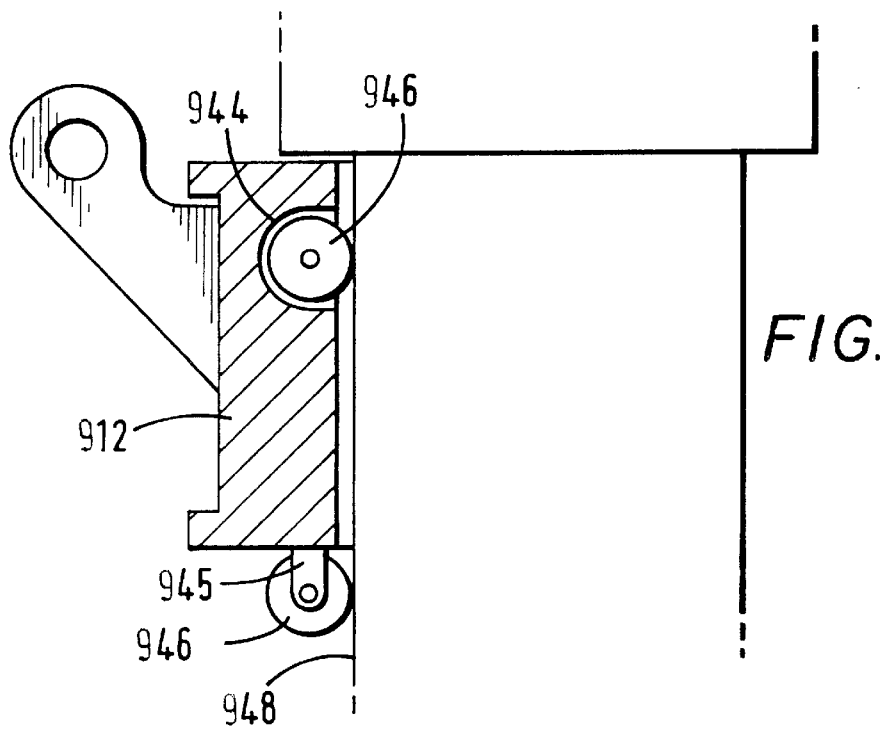

COMPENSATOR SYSTEM FOR WELLBORE TUBULARS

RELATED APPLICATION

This is a Continuation-In-Part of U.S. application Ser. No. 08/998,461 filed on Dec. 26, 1997 entitled "Wellbore Tubular Compensator System" which is a continuation-in-part of U.S. application Ser. No. 08/706,983 filed on Aug. 23, 1996 entitled "Joint Compensator" both co-owned with the present invention. This is a Continuation-In-Part of U.S. application Ser. No. 09/036,271 filed on Mar. 6, 1998 entitled "Single Joint Elevator". All of these three applications are incorporated fully herein for all purposes.

FIELD OF THE INVENTION

This invention is directed to methods and apparatuses for connecting tubular members, (e.g., tubing or casing); to joint compensator systems useful in such methods; to a joint compensator system that supports multiple joints, or an entire string of interconnected joints that extends down into a wellbore; and, in one aspect, such a compensator that inhibits unwanted movement of a stand of joints in a derrick.

DESCRIPTION OF RELATED ART

In many drilling applications, and especially in deep high pressure wells, one or more casing strings are set to protect the wellbore and/or the formation. The handling of heavy individual casing members presents special problems. Considerable skill is needed to lower new casing into position on an assembled casing string and to make a threaded connection between a pin on the new casing and a box on the top of the assembled casing string. Thus, if the new casing is positioned too high above the box on the assembled string, the threads do not engage. On the other hand, if the pin is lowered too far, the full eight of the new casing may rest on the first thread of the assembled string and damage may occur. This may require removal of the damaged casing(s) and costly delays. Even if no thread damage initially occurs as a result of lowering the casing pin too far, if it rests on the assembled string, the worker (the "stabber") may have difficulty in maneuvering the casing to align it so as to make a proper threaded connection. In the event of such a misalignment, cross threading or other thread damage is likely to occur.

Several prior art joint compensator systems are not designed to support an entire string of joints and/or do not inhibit or prevent undesirable movement of such joints within a derrick, particularly unwanted movement of a top end of a stand of joints in a derrick. One such system uses a joint compensator apparatus between a travelling block and a typical elevator. A cable or cables are interposed between the compensator and the elevator. If a stand of multiple joints is lifted with such a system, it is possible for the top of the stand to whip around in the derrick due to the freedom of movement permitted by the cable(s).

When a joint compensator system is used to support only one joint or only one piece of pipe, once the single joint has been moved in and connected to a string that hangs from the slips in the rotary table, the joint compensator must be disconnected and moved out of the way, then a lifting elevator is connected to the string below the travelling block to support the entire string (e.g. during installation of casing or during drilling or workover operations).

Various prior art joint compensators cannot be used with a top drive because they are easily connected directly to and below a top drive. An accidental "overpull" can result during a break out operation when the weight of an entire string is inadvertently applied to a single joint compensator.

SUMMARY OF THE PRESENT INVENTION

The present invention discloses, in certain embodiments, systems and methods for facilitating the joining of two tubular members. In one aspect such a system has a piston mounted in a cylinder with a pneumatic fluid, e.g. air, above and below the piston. A piston rod extends out from the bottom of the cylinder and is connectible to a free joint that is to be joined ("made up") to a fixed joint, e.g. a joint fixed in slips on a rig floor. The top of the cylinder is interconnected with a typical rig travelling block so that the piston/cylinder device may be raised and lowered within the rig. An elevator may be used between the travelling block and the piston/cylinder device. Top and bottom stops in the cylinder limit piston upward and downward movement respectively.

A mechanical rod extends into the cylinder and projects slightly above the bottom stop. The mechanical rod is movable to operate a valve to permit air to flow from an air source (which provides air into the cylinder) to a pressure indicating gauge so that an operator will know when the piston has reached the downward limit of its stroke.

A series of valves and related circuits, flow lines, and apparatuses controls air flow to the cylinder. For a make-up operation a make-up regulator valve is set so that air at a desired pressure is permitted to flow into the cylinder. A pressure relief valve is set to relieve pressure should it exceed some pre-set relief pressure level. A selector valve permits air to flow from either the make-up regulator valve or a break-out regulator valve. A vent valve permits venting of air from the cylinder during a break-out operation. Once the desired amount of air pressure has been introduced into the cylinder for a make-up operation for a first free joint, the cylinder is ready for each succeeding joint; i.e., no operator intervention is needed for this setting for making-up a plurality of joints. This automatic feature facilitates the make-up operation. The present invention, in certain aspects, discloses a joint compensator for compensating for the weight of a first joint and at least one subsequent joint, the first joint to be supported above the at least one subsequent joint, the joint compensator having a body interconnectible between the first joint and moving apparatus, the body including supporting apparatus for supporting the first joint above the at least one subsequent joints and for providing support of the first joint as it moves with respect to the at least one subsequent joint, the supporting apparatus compensating for weight of the first joint as it moves, the support apparatus for alternately supporting the first joint and then the at least one subsequent joint, the support apparatus initially adjustable to compensate for the weight of the first joint so that the support apparatus is also thereby adjusted to compensate for weight of the at least one subsequent joint; such a joint compensator wherein the first joint is a free joint and the at least one subsequent joint is a free joint, the first joint moved to contact and engage a fixed joint after which the at least one subsequent joint is moved to contact and engage the first joint; such a joint compensator wherein the first joint is a fixed joint connected to the at least one subsequent joint, the first joint moved to disengage from the at least one subsequent joint after which the at least one subsequent joint is moved to disengage from a third fixed joint to which the at least one subsequent joint is connected; such a joint compensator wherein the joint compensator continuously compensates for weight of a joint connected thereto; such a joint compensator wherein the support apparatus comprises a movable piston movably mounted in a hollow cylinder with an amount of gas above the piston and an amount of gas below the piston, the piston connected to a piston rod part of which projects from the cylinder for interconnection to a joint to be supported by the joint compensator; such a joint compensator wherein the support apparatus comprises a movable piston movably mounted in a hollow cylinder with a first spring cushion for cushioning the piston on a first side of the piston and a second spring cushioning for cushioning the piston on a second side of the piston; such a joint compensator wherein the first spring cushion is at least one constant force spring; such a joint compensator wherein the second spring cushion is at least one constant force spring; such a joint compensator wherein the first spring cushion is an amount of air; such a joint compensator wherein the second spring cushion is an amount of air; such a joint compensator with control apparatus for selectively controlling the first spring cushion and the second spring cushion; such a joint compensator wherein the first spring cushion is an amount of gas, the second spring cushion is an amount of gas, and the control apparatus further comprises a valving system and a fluid flow line system interconnecting the first spring cushion, the second spring cushion and a source of gas under pressure from which flows gas for the first spring cushion and the second spring cushion.

This invention resides not in any particular individual feature, but in the combinations of them herein disclosed and claimed and it is distinguished from the prior art in these combinations with their structures and functions.

There has thus been outlined, rather broadly, features of the invention in order that the detailed descriptions thereof that follow may be better understood, and in order that the present contributions to the arts may be better appreciated. There are, of course, additional features of the invention that will be described hereinafter and which may form the subject matter of the claims appended hereto. Those skilled in the art will appreciate that the conceptions, upon which this disclosure is based, may readily be utilized as a basis for the designing of other structures, methods and systems for carrying out the purposes of the present invention. It is important, therefore, that the claims be regarded as including any legally equivalent constructions insofar that do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one of skill in this art who has the benefits of this invention's realizations, teachings, and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions of further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by references to certain embodiments thereof which are illustrated in the appended drawings, which drawings from a part of this specification. It is to be noted, however, that the appended drawings illustrate certain preferred embodiments of the invention and are therefore not to be considered limiting of its scope, for the invention may admit to other equally effective or equivalent embodiments.

FIGS. 4 and 5 are charts presenting data regarding joints and valve settings for methods according to the present invention.

FIG. 12 is a schematic view of a typical prior art wellbore rig set up of a single joint compensator system (e.g. as described in Canada patent 1,239,634 co-owned with the present invention and incorporated fully herein for all purposes).

FIG. 16A is a front view of a control apparatus for a system as in FIG. 13A. FIG. 16B is a side view and FIG. 16C is a top view of the control apparatus of FIG. 16A.

FIGS. 17A–17H are side views showing steps in a typical operation of a system according to the present invention with certain items shown schematically.

FIG. 18A is a side view of an elevator according to the present invention. FIG. 18B is a top view and FIG. 18C is a side cross-section view of the elevator of FIG. 18A.

FIGS. 19D and 19E are enlargements of part of the system of FIG. 19A.

FIG. 25C is a top view of the elevator of FIG. 25A.

FIG. 26 is a partial side view of an elevator according to the present invention.

DESCRIPTION OF EMBODIMENTS PREFERRED AT THE TIME OF FILING FOR THIS PATENT

Figure 1:
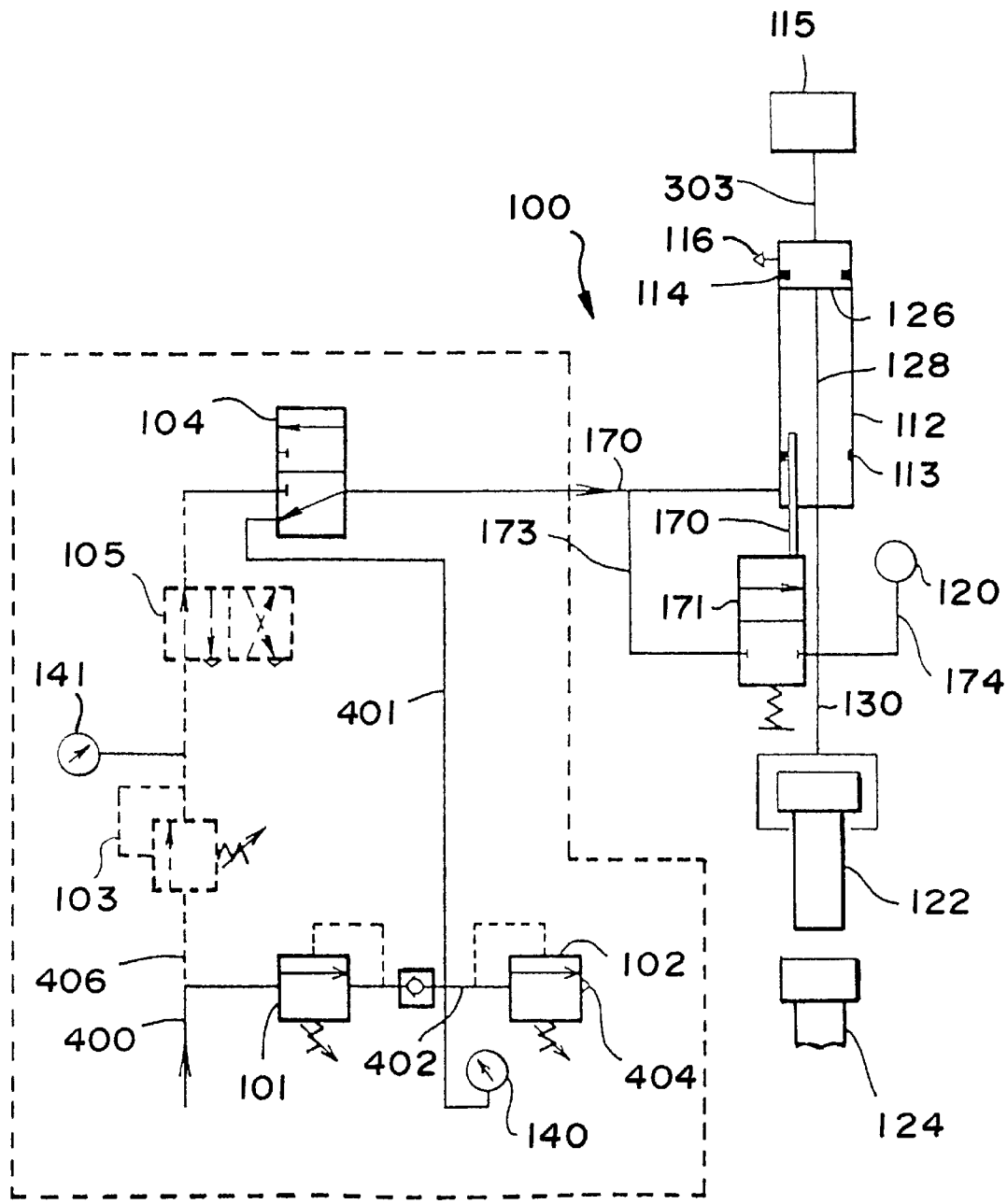
FIG. 1 is a schematic view of a system according to the present invention.

It is an object of at least certain preferred embodiments of this invention to provide new, useful, unique, effective and nonobvious systems and methods for supporting and compensating for the weight of a joint to be connected to or disengaged from another joint. FIG. 1 shows a system 100 according to the present invention for joining (making-up) or disconnecting (breaking-out) two tubulars, e.g. a free casing 122 and a fixed casing 124. In a typical make-up operation, a selector valve 104 is placed in a position as shown so that air from an air source (pressurized air source not shown) can flow in a line 400 to a make-up regulator valve 101, in a line 401, through the selector valve 104, through a line 170, into a hollow cylinder 112 beneath a piston 126 movably mounted in the hollow cylinder 112. A pressure relief valve 102 controls air flow in a line 402 and out through a vent 404. A gauge 405 indicates air pressure level in the line 401.

A break out regulator valve 103 is closed so air does not flow through a line 406. Initially the make-up regulator valve 101 is also closed. The valve 101 is set to a setting (an air pressure level) which corresponds to a force that equals about a portion of the weight of the free joint 122 (an air pressure which is a percentage of that pressure which could support the weight of the free joint 122); e.g. at about 40% of the free joint weight or greater. In one aspect the make-up regulator valve is set at an air pressure that corresponds to about 60% of the weight of the free joint 122. This weight can be determined by using a chart that specifies such weights; a computerized look-up table; or by using the cylinder 112 as follows: air is permitted to flow into the cylinder 112 by opening the make-up regulator valve 101 so the piston 126 goes up in the cylinder 112; using the relief valve 102, air is then permitted to escape from the cylinder 112 until the piston 126 starts to move down, indicated by watching the gauge 140; the pressure reading from the gauge is noted which corresponds to the weight of the free joint. With the make-up regulator valve set, e.g. at about 60% of the free joint weight, the free joint 122 is picked up (e.g. with a line 130 connected to the piston rod 128) and the piston 126 is within the cylinder 112 not at its top nor at its bottom.

The downward limit of travel of piston 126 is indicated when the piston 126 contacts a movable rod 170 which opens a valve 171, permitting air from the line 170 to flow in a line 173 and in a line 174 to a gauge 120 thus providing a visual indication and/or air signal to indicate that the piston 126 has reached the downward limit of its travel. With the piston in mid stroke and relief valve 102 closed, the relief valve 102 is opened gradually by an operator who watches the free joint 122. When the free joint 122 moves down, the relief valve 102 is closed. At this point the free joint 122 is supported by the piston/cylinder device and the piston 126 is not at either limit (up or down) of its movement. The setting of the relief valve 102 is now increased slightly beyond that necessary to arrest downward motion of the piston. The free joint 122 is now "stabbed" manually into the fixed joint 124 by manually pulling down on the free joint 122 or by lowering a rig line 303 to the cylinder 112 and to a travelling block 115. As the free joint 122 is pulled down, the piston 126 is lowered, increasing air pressure in the cylinder 112. The increased air pressure exceeds the pressure setting of the relief valve 102 and the excess pressure is thereby vented through the vent 404 as the free joint 122 is moved down.

In the event the free joint is not stabbed correctly into the fixed joint, the piston/cylinder device still supports the weight of the free joint and, if the free joint touches the fixed joint, damage to the fixed joint (and to the free joint) is reduced or eliminated. If the travelling block 115, etc. continues downward movement after an unsuccessful stabbing attempt and the fixed joint is supporting some portion of the weight of the free joint, the piston 126 goes up in the cylinder 112, the gas in the cylinder expands and the piston/cylinder device accommodates the downward motion of the travelling block 115, etc. so the fixed joint only supports part of the free joint's weight—in certain embodiments preferably no more than 5%, 10%, 25%, 50%, or 70% of the free joint's weight.

Once the free joint 122 is stabbed correctly into the fixed joint 124, the free joint 122 is rotated (e.g. with any known tong or rotator) to engage the fixed joint (e.g. threadedly) and move down as make-up commences. As the free joint moves down, air pressure in the cylinder 112 increases. When it exceeds the set relief pressure of the relief valve 102, excess pressure is vented through the vent 404, while a cushion of air continues to support the free joint until make-up is completed.

Then the travelling block is lowered so an elevator attached to the previously free joint can be released. Upon such release, the piston 126 moves to the top stop 114—i.e., the piston 126 automatically moves up to a position suitable for picking up another free joint for making up with the previously-free now-fixed joint 122; etc. until a desired number of joints are made up.

Figure 2:
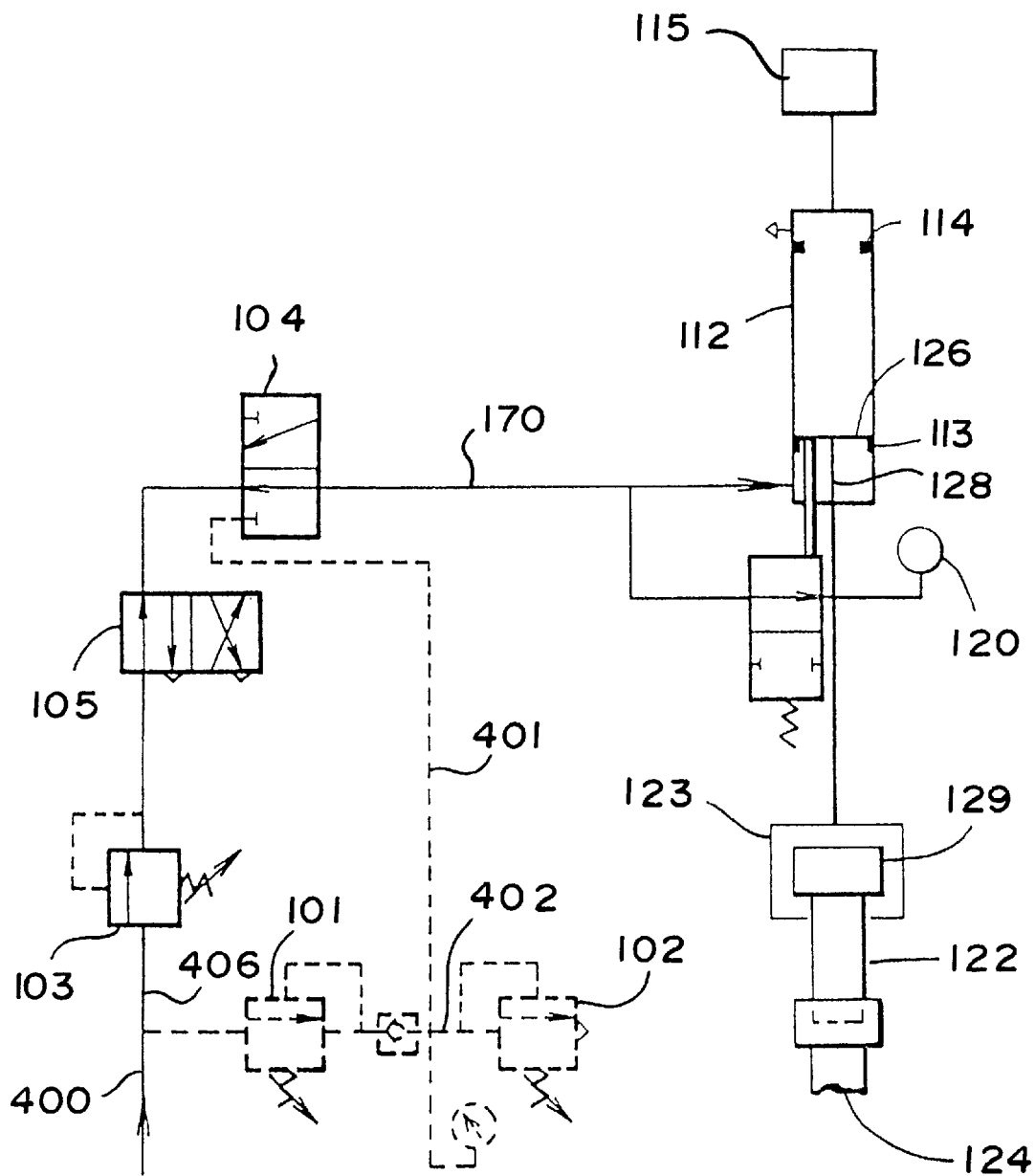
FIG. 2 is another schematic view of the system of FIG. 1.

In a typical breakout operation according to the present invention, the breakout regulator valve 103 is set to a pressure corresponding to an amount greater than the weight of a joint to be disconnected; in certain aspects about 102%, 104%, 105%, 110%, 115%, or 125% of said weight. Selector valve 104 is set to the breakout position. Vent valve 105 is opened to release air from underneath the piston 126 and the piston 126 moves down to contact the stop 113 as indicated by the gauge 120. A clamp (e.g. a single joint elevator) 123 connected to the line 130 (as is used in make-up operations) is clamped below a collar 129 of the joint 122. Vent valve 105 is closed so air is allowed to enter, under pressure, beneath the piston 126 (see FIG. 2), resulting in the lifting of the clamp 123 to contact the collar 129—at which point the pressurized air in the cylinder 112 is sufficient to support the joint 122. The breakout regulator valve 103 could be set at a pressure about equal to the joint weight; but preferably the pressure regulator valve 103 is set at a pressure corresponding to more than the joint weight so that upon turning and freeing of the joint, the joint is raised and does not contact or bounce on the joint from which it has been disconnected thereby reducing injury to both members. As the joint 122 is unscrewed it is constantly supported.

The freed joint is then disconnected from the elevator 123 at which point the piston 126 raises to contact the top stop 114. The vent valve 105 is then operated to vent air so the piston 126 moves down to contact the stop 113. At this point the breakout of another joint may be commenced.

Figure 3:
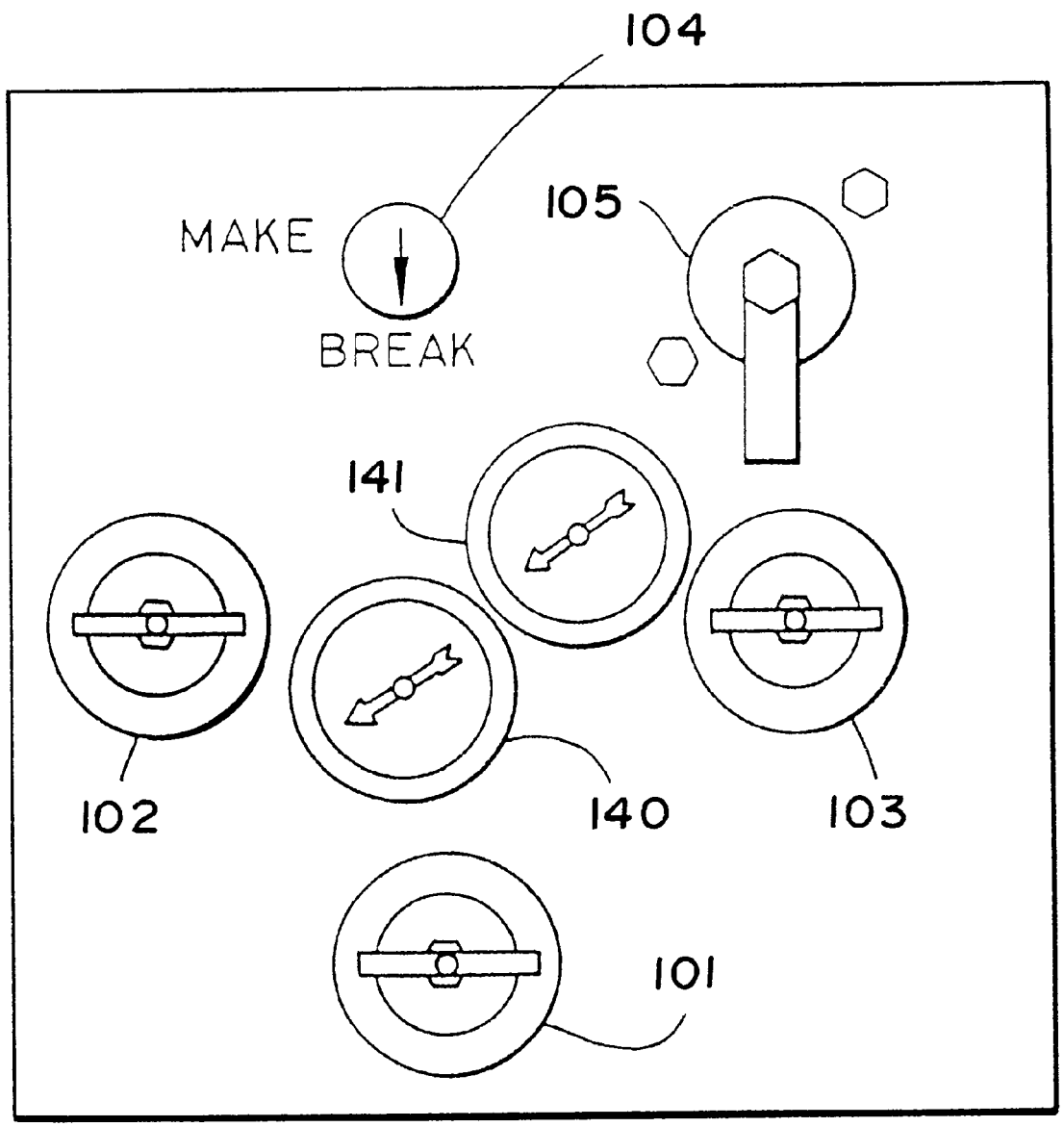
FIG. 3 is a schematic view of a control panel useful with the system of FIG. 1.

FIG. 3 shows one embodiment of a control panel 350 with controls for various valves described above. An operator can use such a control panel, interconnected with the various valves, the piston/cylinder device, the various gauges, and a pressurized air source, on the rig floor, near a tong, or up in a rig derrick. Alternatively such a panel can be wireless, mobile, and/or remote from any location mentioned above. The dotted outline of FIG. 1 encloses items controlled by the control panel of FIG. 3.

FIGS. 4 and 5 present charts useful with methods according to the present invention to determine air pressure ratings corresponding to a joint of a particular weight and for determining "makeup" and "breakout" pressure settings for the various valves described above. In both FIGS. 4 and 5, Column A indicates the weight, in pounds per foot of a joint, e.g. a piece of casing. Column B indicates the weight in pounds of 40 feet of a joint as in Column A. Column C indicates the air pressure in p.s.i. necessary to support the joint of column B—for FIG. 4 the joint compensator (piston/cylinder device) like that of FIG. 1 has a cylinder (like the cylinder 112) with an inner diameter of about ten inches and for FIG. 5 of about three inches. Column D indicates a suggested air pressure setting in p.s.i. for the make-up regulator valve for make-up operations. Column E indicates a suggested air pressure setting in p.s.i. for the breakout regulator valve for breakout operations.

FIGS. 6–11 illustrate a system 500 according to the present invention which is like the system of FIG. 1 in many respects (and the same numerals indicate the same items); but the system 500 provides for continuous compensation and for automatic re-setting of a joint compensator upon breakout of one joint for the next joint to be broken out—in addition to such automatic re-setting for make-up of joints. Whereas in the system of FIG. 1 a manual valve is operated to release a spring cushion (spring and/or gas) from beneath the piston 112, in the system of FIG. 6 a joint compensator has a piston that automatically moves downwardly due to the action of a variety of limit switches and a yoke acted on by the piston. During a breakout operation joints subsequent to a first joint are broken out without the need for operator actuation of a vent valve (e.g. valve 105, FIG. 3).

Figure 6:
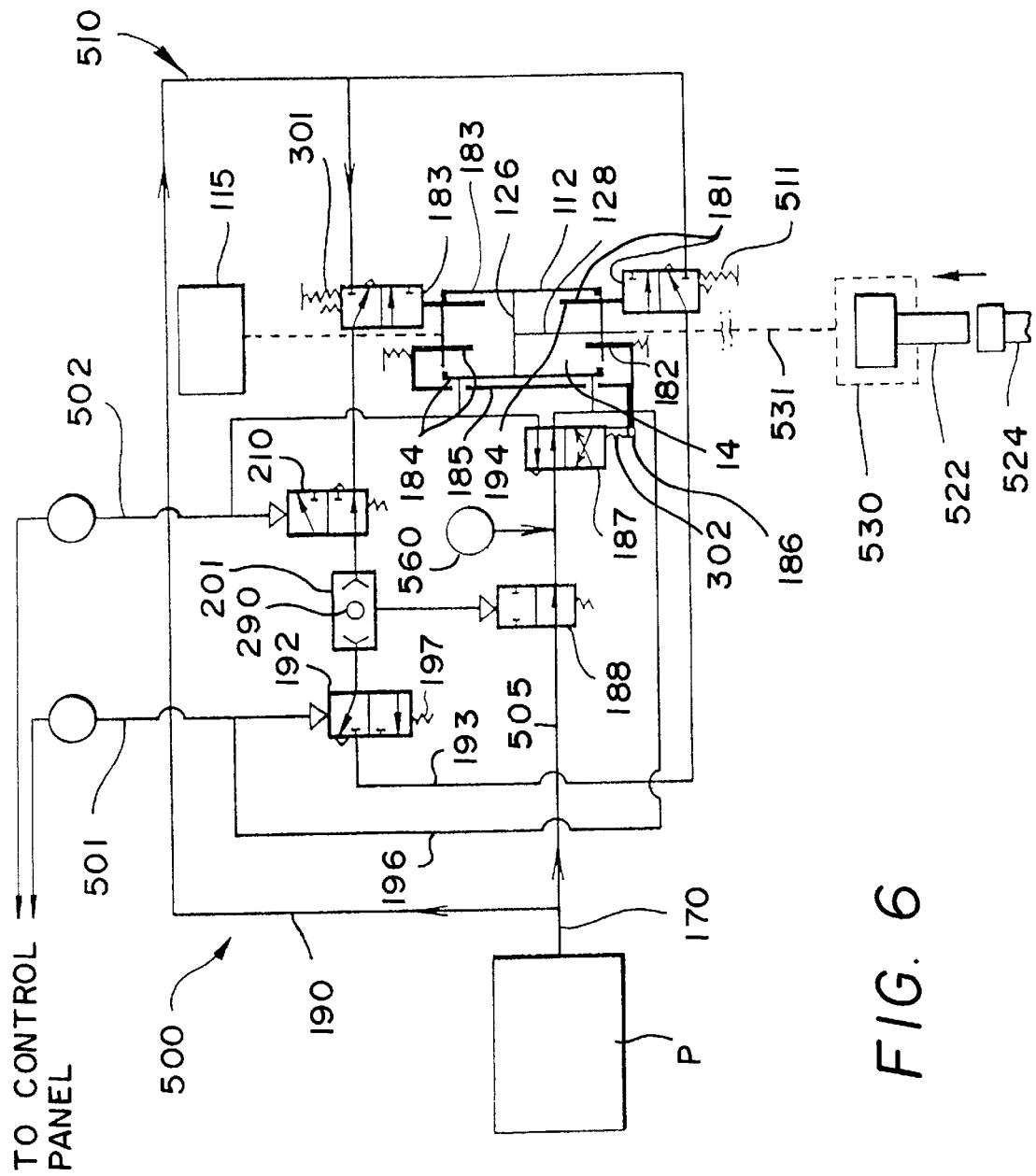
FIGS. 6–11 illustrate schematically operation of a system according to the present invention.

FIG. 6 illustrates use of the system 500 after a joint 522 has been broken out from a joint 524 (joint 524 fixed in a rig). The joint 522 is being lifted by a joint compensator 510 according to the present invention. Air pressure for lifting the joint, from a pressurized air source P, is controlled by valves, flow lines, etc. as in the system and control panel of FIG. 1. In the system 500 a break limit pilot line 501, a make limit pilot line 502, and a pilot line 190 are interconnected with the control panel and system. Air under pressure is supplied at about 110% of "neutral" (estimated joint weight and corresponding air pressure to support same) to the space below the piston 126. Air initially enters a cylinder 112 via an interruption control valve 188 and a directional valve 187 which receive air from the flow line 170 via a flow line 505. An elevator (not shown) connected between the piston rod 128 and the joint 522 is not moving (as in FIG. 6), but the joint 522 is moving up due to air pressure below the piston 126. Stop valves 181 and 183 positioned adjacent the cylinder 112 are closed due to the pressure of their respective springs 511 and 301.

Figure 7:
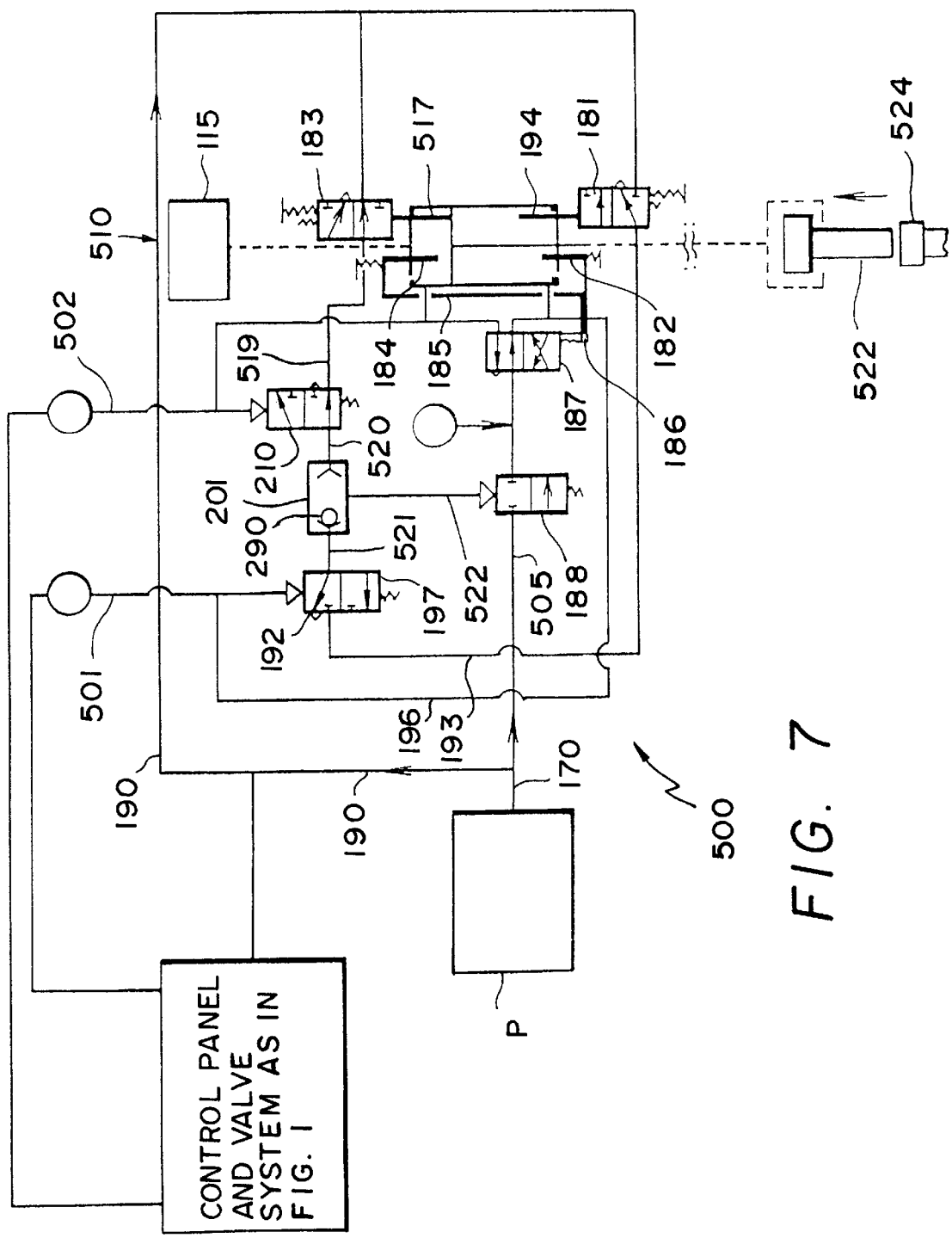

FIG. 7 illustrates the system 500 supporting the joint 522, compensating for its weight, and prepared to release it. The piston 126 has moved up to encounter a movable rod 517 of the stop valve 183, depressing the rod (moving it up in FIG. 7, thereby opening a fluid flow path of signal air to flow to a pilot valve 210 through line 519. This air crosses the pilot valve 210 and enters a shuttle valve 201 which has a movable ball 290 through a line 520. The shuttle valve 201 is open to vent in its opposite side to line 521, the ball 290 closes off the vented side and the signal air pressure is applied through a line 522 to operate the interruption control valve 188. The valve 188 is shifted and blocks further air flow from the source P that is entering the directional valve 187 and the cylinder 112. This blockage arrests the upward motion of the piston 126 and joint 522.

Figure 8:
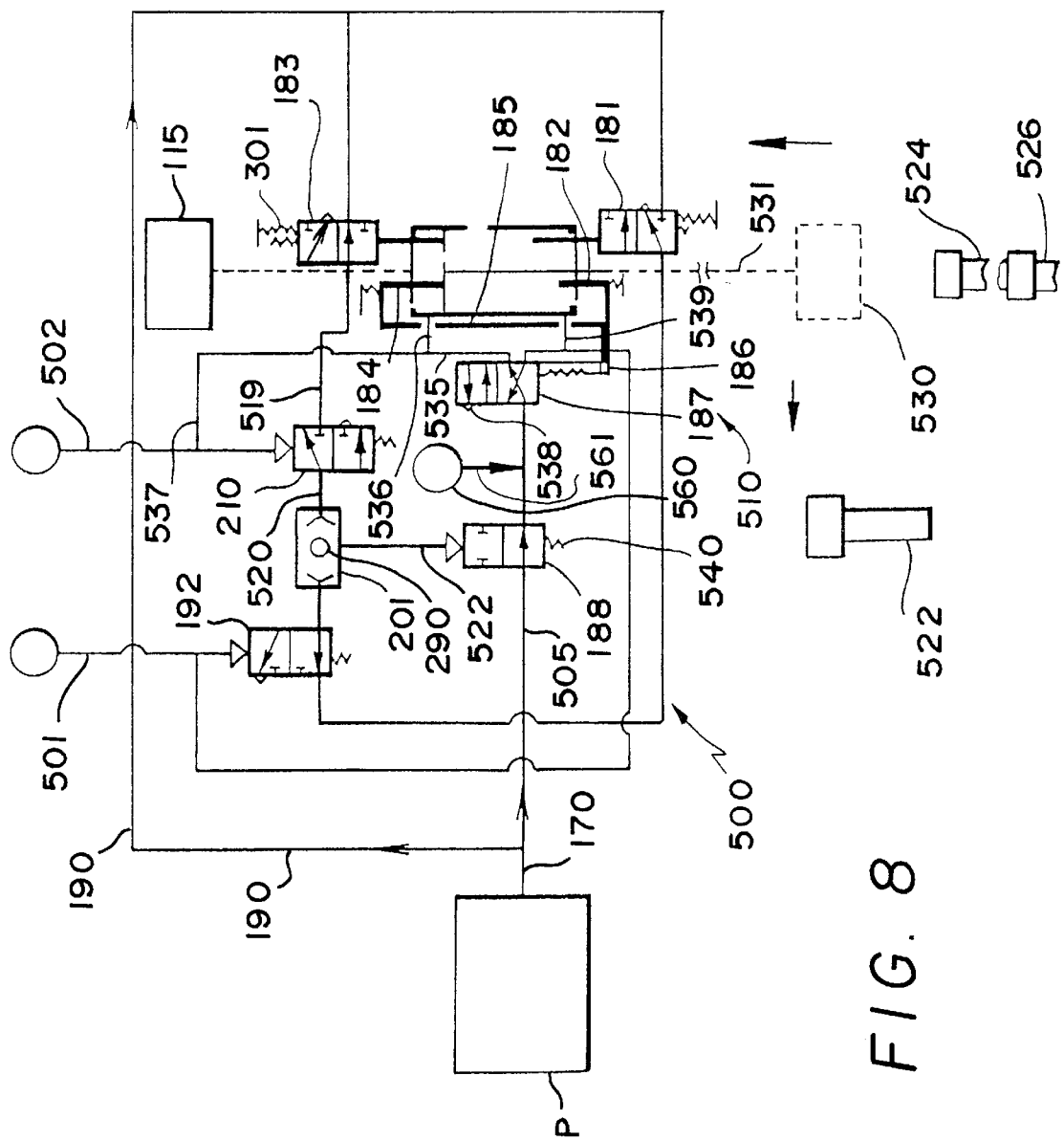

FIG. 8 illustrates the system 500 with the joint 522 released and the system ready to return to break out another subsequent fixed joint, now the joint 524, from a joint 526 to which the joint 524 is fixed. With the joint 522 moved out of the way with typical known joint moving apparatus, the joint 522 is unhooked from the elevator (shown schematically in dotted line as 530 in FIG. 8). The removal of the joint's weight from the joint compensator reduces the load on the piston 126 and on a line 531 creating a increase in the net upward force on the piston 126 which overcomes a supporting spring 301 positioned between the cylinder 112 and the stop valve 183, causing the valve 183 to travel upward with the piston 126. The piston 126 continues upward until it reaches an upper end 184 of a yoke 185 that is movably attached to the directional valve 187. The piston 126 pushes on the yoke 185 causing it to actuate the valve 187 via contact with the finger or pin 186. The yoke 185 and the directional valve 187 may be supported by the cylinder 112 or by a frame work attached thereto. When the valve 187 is actuated by motion of the yoke 185, the directional valve 187 shifts and directs air via lines 535 and 536 to the top of the cylinder 112, and via a line 537 to the top of the pilot valve 210, allowing air from below the piston to vent freely through the valve 187 and vent 538 via a line 539. An operator of the pilot valve 210 actuates the valve 210 to open the branch connected to the shuttle valve 201, permitting the branch and shuttle valve 201 to vent to atmosphere, thus relieving an operator of the control valve 188 whose spring 540 shifts the valve allowing source air to travel to the directional valve 187 and to the top of the piston 126.

Figure 9:
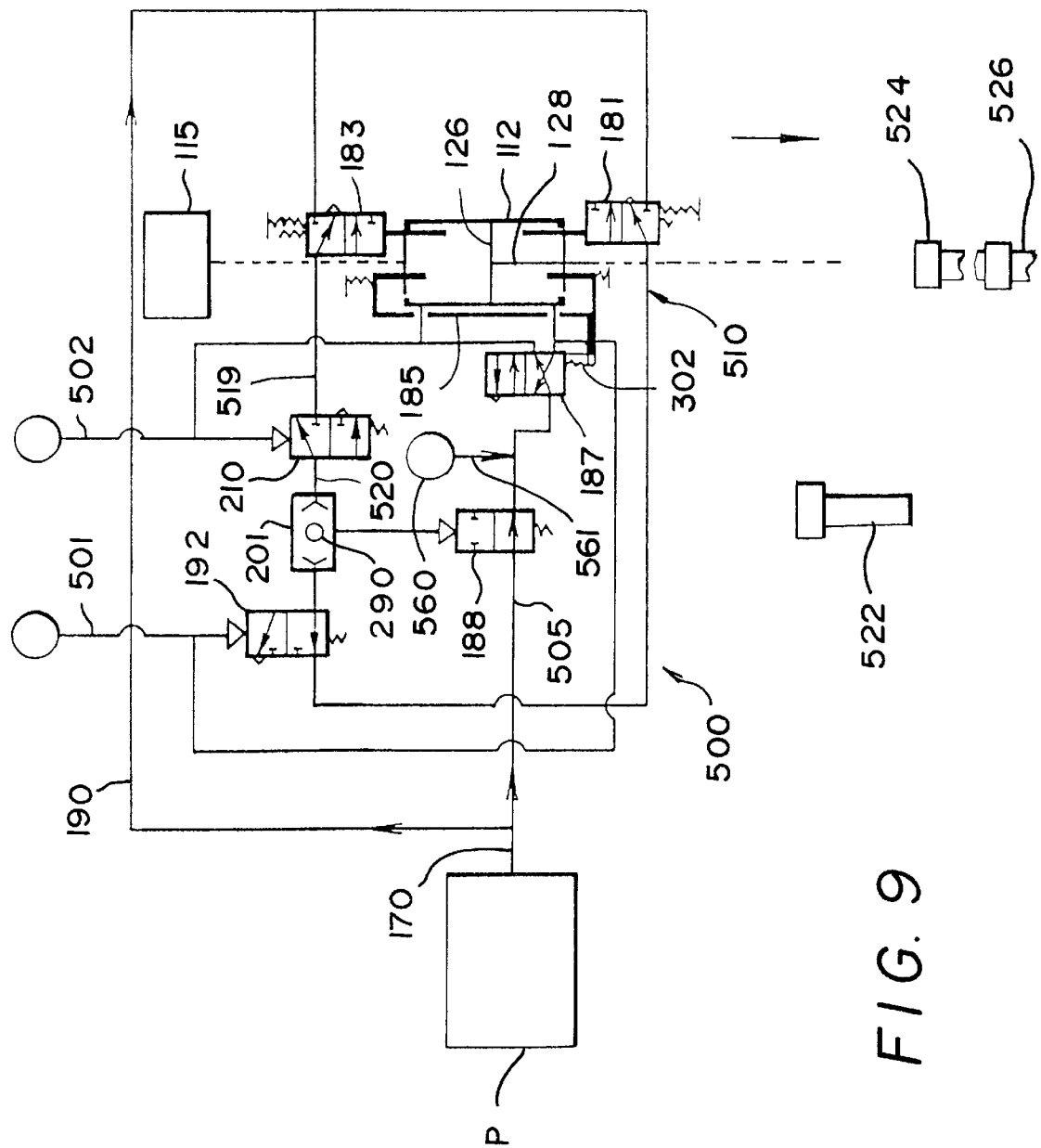

FIG. 9 illustrates the system 500 ready to return to support and compensate another joint for breakout. With air applied to the top of the piston 126, the piston 126 begins to move down to a "start" position for breakout. The yoke 185 which is actuating the directional valve 187 has a locking detent 302 and remains in a shifted position until the opposite end of the yoke 185 is moved and thus air flow to the top of the piston 126 is sustained when the piston 126 breaks contact with the yoke 185 and with the stop valve 183. When the piston moves away from the stop valve 183 on its downward stroke, the valve's spring actuator returns it to normal position, venting air in the line 519.

Figure 10:
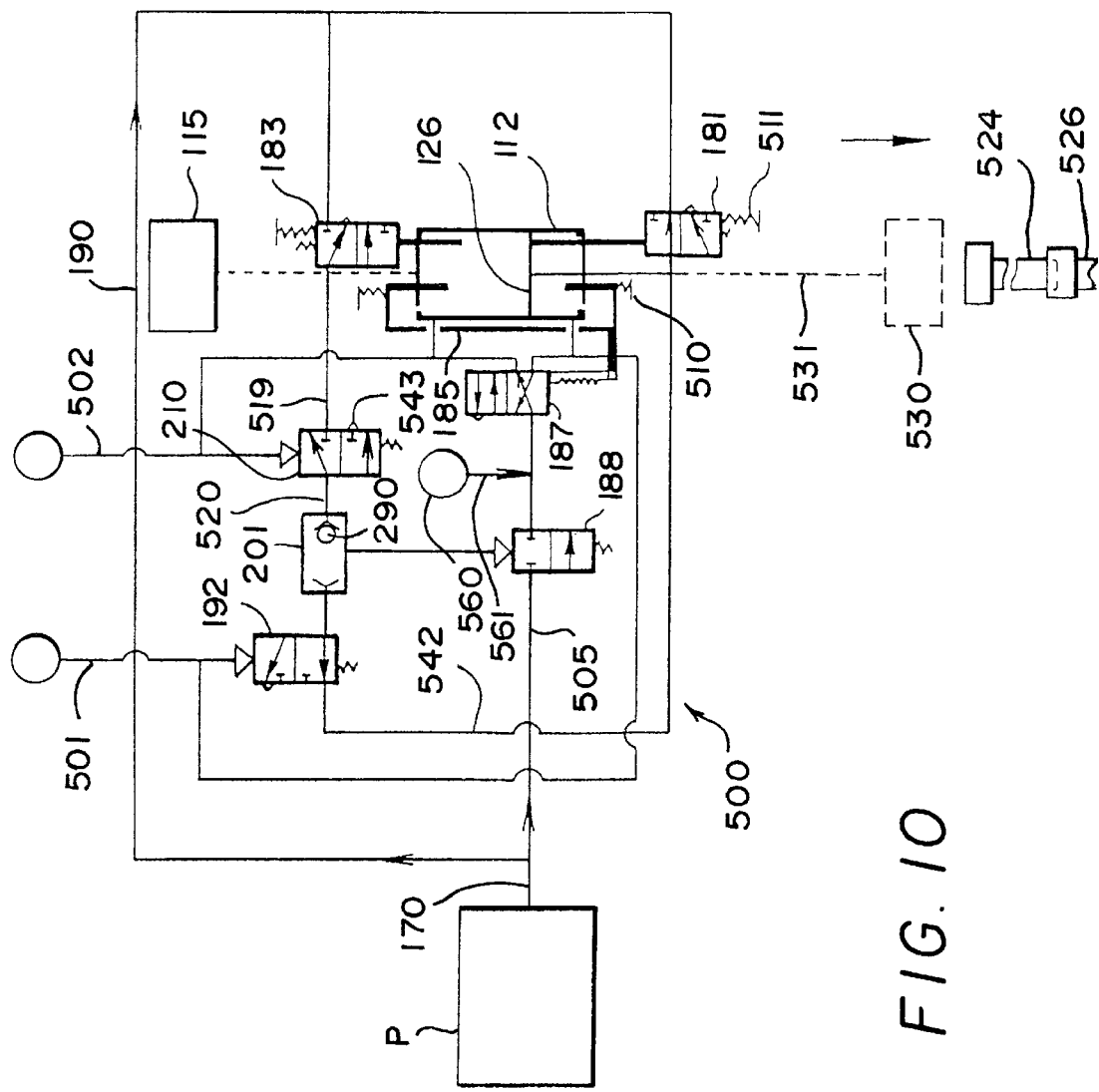

FIG. 10 shows the system 500 ready to latch onto another fixed joint for breakout. The piston 126 continues its downward stroke until it encounters a lower stop valve 181. When the piston 126 moves down sufficiently to actuate the lower stop valve 181 (against its spring 511 positioned between the valve and cylinder or a frame of the cylinder), air is admitted through the valve 181 to a pilot valve 192 via a line 542 and thus to the shuttle valve 201. Since the opposite branch of the shuttle valve 201 is vented to atmosphere via vent 543, the ball 290 closes the vent path and air is admitted to the interrupter control valve 188 which shifts the valve "down," interrupting air flow to the directional valve 187 and to the top of the piston 112. Downward motion of the piston ceases and the joint compensator 510 is ready for attachment to the next fixed joint 524.

Figure 11:
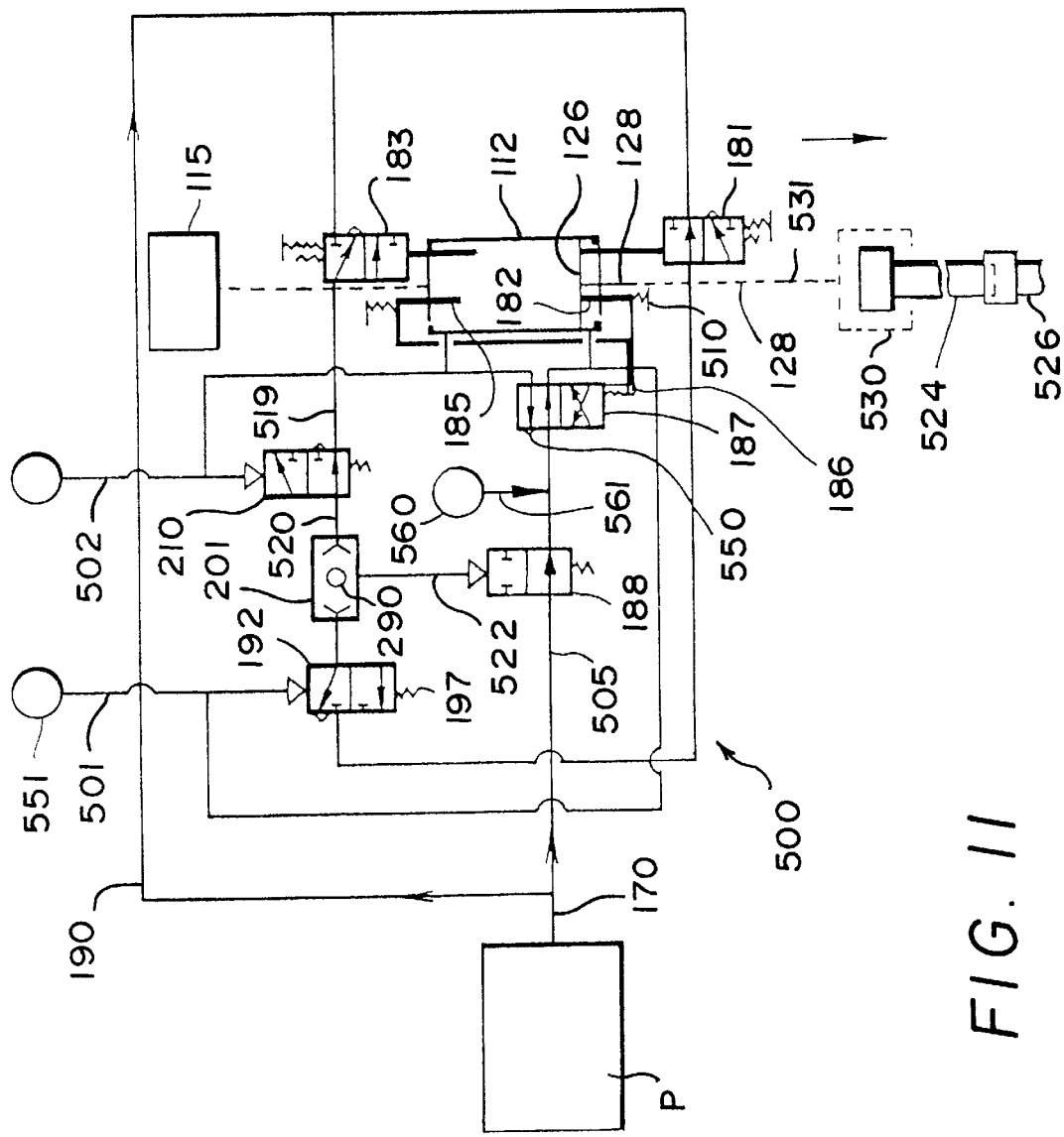

FIG. 11 shows the joint compensator via the elevator 510 latched to the joint 524 and slack taken out of the line 531 (attached to the piston rod 128) by hoising the various items with the travelling block 115 and related apparatus. Upward motion of the cylinder 112 brings a pin 186 of the yoke 185 into contact with the piston 126. This force moves the actuator pin 186 down, shifting the directional valve 187 to a new position. With the directional valve 187 reversed now, air is routed from it to the bottom of the piston 126. The top of the piston 126 is vented through the valve 187 and its vent 550. Air is also applied to the operator of the pilot valve 192 and to a break limit indicator 551. The pilot valve operator moves the pilot valve 192 against its spring 197, allowing venting of air pressure between the pilot valve 192 and the operator of the interrupter control valve 188, which unlatches permitting air flow into the directional valve 187 and the cylinder 112. An accumulator 560 provides additional air volume via a line 561 to operate the pilot valve 192. At this point the joint compensator is ready to apply compensating force upward for the joint 524 and the breakout of the joint proceeds.

As described above various amounts of air (or any other suitable gas) provide a spring cushion above and below a piston in a cylinder. Either amount of air may be replaced by a spring or springs (in one aspect constant force springs). In one aspect a spring is connected to the piston and to the cylinder's interior and another spring, on the same side of the piston, is connected either only to the piston or only to the cylinder. A similar arrangement may be made on the other side of the piston. As shown, e.g. in FIG. 6, various rods and actuators extend into the cylinder 112. With appropriate connections and securements, upper and lower rods connected to the piston and movable therewith, with a portion projecting beyond the cylinder may be used to actuate appropriate valves. The various valves and flow lines of the system 500 (other than the source P and control panel) may be adjacent the joint compensator 510.

For make-up operations, the system 500 is used as is the system of FIG. 1.

FIG. 12 shows a prior art arrangement for a joint compensator J connected in a rig (not shown) to a travelling block (not shown) above. A mechanical swivel T is interposed between the compensator J and cables C that are attached to an elevator E, the elevator E holds a joint of pipe or casing P that is to be threadedly mated with a top joint N of a string of tubulars (not shown) supported by slips (not shown) in the rig floor. A tong O rotates the joint P. The compensator J is controlled from a console S that receives compressed air from a rig air supply A. The console may be mounted on the rig or rig floor or, alternatively, on the tong O or nearby. An air hose H extends from the console S to the compensator J.

Figure 14:
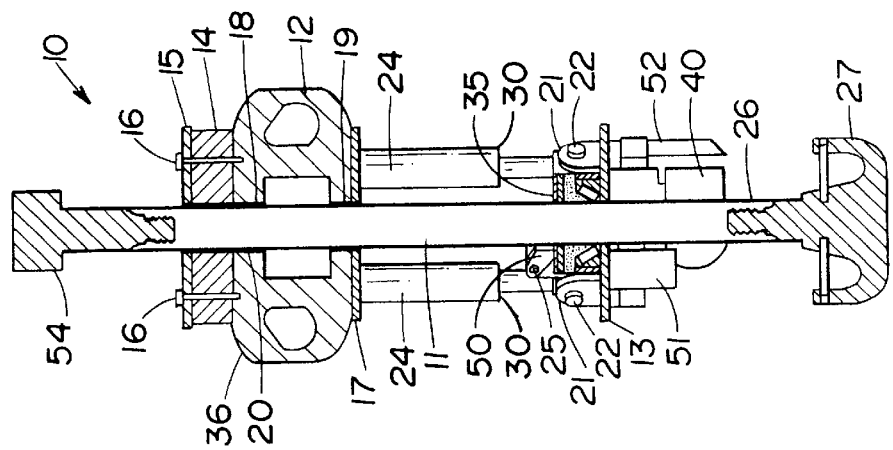
FIG. 14 is a front view of a joint compensating system according to the present invention.
Figure 13B:
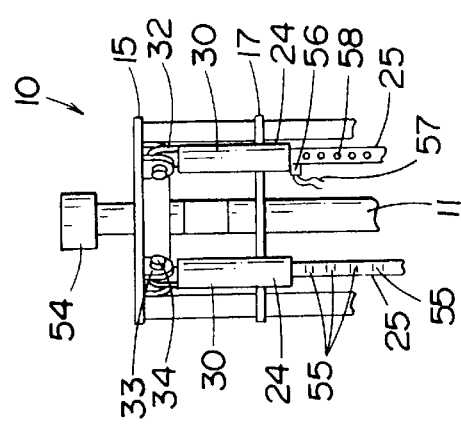
FIG. 13B is a side view of a portion of the system of FIG. 13A.
Figure 13A:
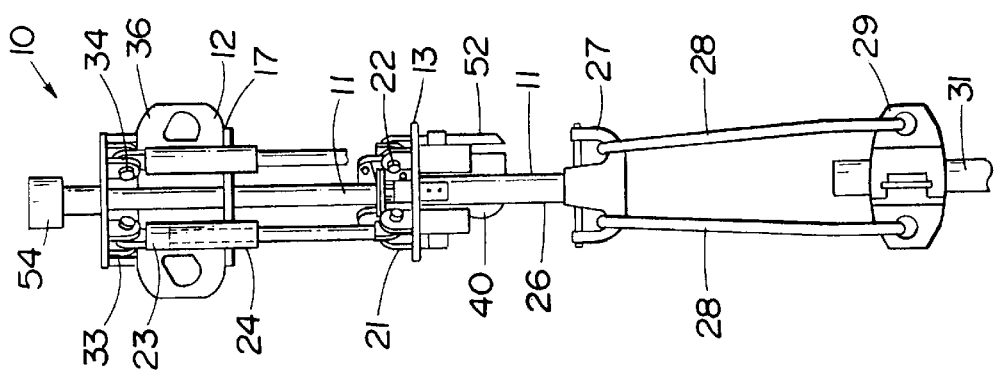
FIG. 13A is a front view of a joint compensating system according to the present invention.

FIGS. 13A, 13B, and 14 show a compensator 10 according to the present invention that has a central rotatable stem 11 that rotatably extends through a string support/lifting elevator 12 and a support block 13 movable up and down as rods 25 move.

The lifting elevator 12 (or any suitable known lifting apparatus) has a top block 14, and a top plate 15 secured to a main body 36 by bolts 16. A lower plate 17 is welded to a lower part of the main body 12. Alternatively this piece may be welded together or otherwise secured together, or formed integrally of one piece. A top bushing 18 and a bottom bushing 19 within a central bore 20 of the main body 12 through which passes the stem 11 facilitate stem rotation. The bushings are commercially available and made of typical bushing material. Alternatively, bearings may be used.

One or more weight compensating cylinders 30 (two shown of the four in the embodiment of the system 10) are connected at the bottom of the top plate 15 and at the bottom to mounts 21 with pins 22 (which are, in one aspect, shear pins which shear prior to damage to the cylinders 24, e.g., in the event of bearing freeze up and/or damaging twisting of the cylinders). The mounts 21 are secured on the support block 13 (e.g. by welding) Each cylinder 30 is a typical fluid cylinder (e.g. pneumatic, hydraulic, as e.g., commercially available from the Prince Co., or gas) with a movable piston 23 within a housing 24 connected to a piston rod 25 that itself is connected to the mounts 21. Any suitable number of cylinders 30, of any suitable size, including one, two, three, four, five, six or more may be used. A bellows air spring may replace the cylinder or cylinders.

A lower end 26 of the stem 11 is connected to a yoke 27 to which are movably connected bails 28 that extend down to a joint elevator 29 (also called a "string" elevator or a "primary" elevator) connected to a tubular, pipe, joint, piece of casing, or tubular string 31 (which may be, e.g. a string of casing, drill pipe, risers, tubing or any wellbore tubular members).

A top end 32 of the cylinders 30 is releasably secured to mounts 33 below the top plate 15 by pins 34. An optional motor 40 shown schematically mounted on the support block 13 turns the stem 11 which extends through the support block 13. An optional brake 50 mounted on the support block 13 provides braking by acting between the support block 13 and the stem 11. A brake cylinder 51 is mounted below the support block 13 and interconnected with the brake 50. A motor guard 52 shields the motor 40.

The stem 11 has a top stop member 54 for stopping abutment against a top surface of the plate 15. When the stop member 54 thus rests on the plate 15 the stem 11 rather than the cylinder(s) 30, supports the string 31. Either elevator 12 or 29, in one aspect, is able to support an entire tubular string that extends down into a wellbore, including, but not limited to, strings weighing several million pounds. In one aspect both elevators have such a capacity. A stem stop 35 on the stem 11 is movable with the stem to abut a brake pad 53 which rests movably on a bearing device 99 with multiple roller bearings 98 that facilitate stem rotation. In one aspect the brake pad 53 has a bottom surface shaped as a bearing race to correspond to the shape of roller bearings in the bearing device 99.

The system 10 may be used in a typical rotary rig with the system hanging below the rig's travelling block. Alternatively, the system 10 (and/or any system disclosed herein) may be connected above or below a top drive D, or included within a housing that includes the top drive. In one aspect a system 10 has the supporting capacity of the elevator. In one aspect of a system 10 as shown in FIG. 13A, the total stroke length of the system is equal to or greater than about twice the thread length of the tubulars being worked with; and in one particular aspect the stroke length is about fourteen inches, i.e. up or down about seven inches, corresponding to tubulars whose thread length is about five to about seven inches. In one aspect, the stroke is commensurate with the length of the piston rods and the length of the rods is chosen as desired. In one aspect, the rods, for safety, are about two inches longer than the maximum effective stroke of the system.

To provide an indication to personnel on a rig below the system 10 of the position of the piston 23 or the location of the system at a given moment in its stroke, a variety of indicators may be used. For example, a series of markers, indicia, numerals, or stripes 55 may be applied to the piston rods 24 to indicate the extent of their extension outside the housing and thereby indicate stroke position. Alternatively an electronic sensor or switch 56 activated by movement of the rod 24 or by indicators 58 thereon may be used, which communicates with a receiver system (wirelessly or via a cable 57) to personnel spaced apart from the system 10. Alternatively, the volume of fluid within a cylinder may be monitored to indicate piston/rod position.

With the system 10 it is possible to rotate the joint or joints hanging therefrom while compensating for their weight; i.e., the weight of the tubulars is not apparent to apparatus below the compensator system. It is also possible to make up such a joint or a stand of joints and then to lift the entire string without opening any of the elevators.

Figure 15C:
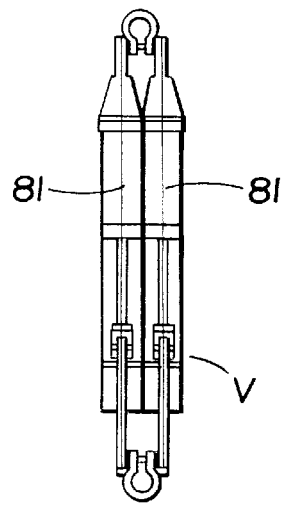
FIG. 15C shows gas cylinders of the system of FIG. 15A.

FIGS. 15A–15C show a modular system 80 for single joint compensation or for the compensation of multiple joints of known weight with four air cylinders 81 (in one aspect like the cylinders 30 described above) and a control system (e.g., any system described herein) with a control panel that controls fluid flow from a supply, e.g. a typical rig compressed air supply to the system. A central valve (not shown) selectively isolates make-up from break-out functions.

The control system of FIG. 15A may be like those described previously herein and functions in the same or a similar manner.

Figure 15D:
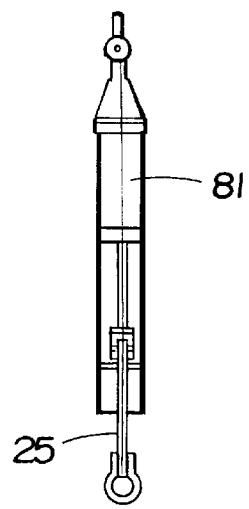
FIGS. 15D, E, F are front views of modules of one, three, and four gas cylinders, respectively, for use with a system as in FIG. 13A.
Figure 15E:
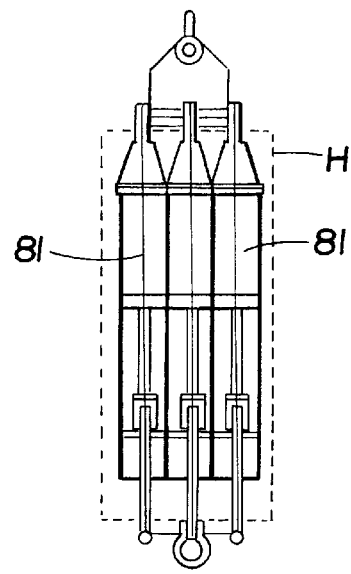
FIG. 15A is a schematic view of a control panel for a system as in FIG. 13A.
FIG. 15B is an enlargement, partially in cross-section, of a portion of the system of FIG. 15A.
FIG. 15G is a schematic view of a four cylinder module.
Figure 15F:
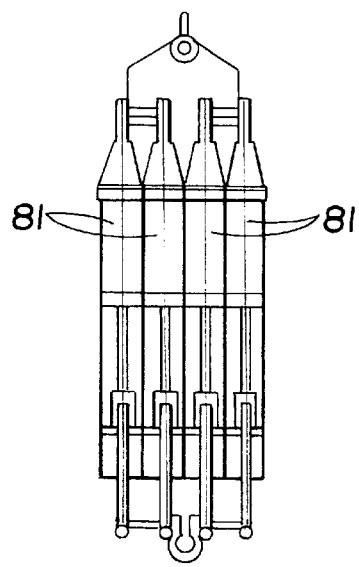

FIG. 15D shows a single cylinder usable with the system. FIG. 15E shows three cylinders and FIG. 15F shows four cylinders. In one embodiment a cylinder has a bore area of 28.27 square inches; a rod area of 1.485 square inches; an effective area (bore minus rod) of about 26.8 square inches and is able to support about 2500 pounds. The pressure of fluid within the cylinder is about 93.3 p.s.i. The pressure required to support 2 tons is about 80 p.s.i. Two such cylinders as in FIG. 15C can support 5 tons at 93.3 p.s.i. and 4 tons at 80 p.s.i. Three such cylinders as in FIG. 15E at 93.3 p.s.i. can support 7.5 tons and, at 80 p.s.i., 6 tons. Four such cylinders, as in FIG. 15F, can support 10 tons at about 90 p.s.i. and 8 tons at about 80 p.s.i.

FIG. 15B shows an end of a connector that connects the cylinder(s) to a top drive D (or, alternatively, to connection apparatus, a hook, or a swivel with the typical drawworks in a rotary rig). A tensile member within the connector is designed and fashioned so that it will fail (break) at a known load thereon, at which point a chain CH supports the load. In one aspect, the failure load is about three tons. Such a tensile member protects the system from an accidental overload by allowing the module including the cylinders to drop down a few inches, thus transferring the load to connectors and apparatus above. In one aspect the chain is designed with a safety factor of three, i.e., to support three times the maximum expected load.

In one aspect the system of FIG. 15A is used with relatively light pipe (in one aspect joints weighing less than 2000 pounds) by venting all but one or less than all cylinder (s) of a multicylinder module via a vent V (see FIG. 15C, e.g.). If desired, in the one (or more) remaining operative cylinder(s) a higher fluid pressure is used rendering the system more responsive.

Figure 15G:
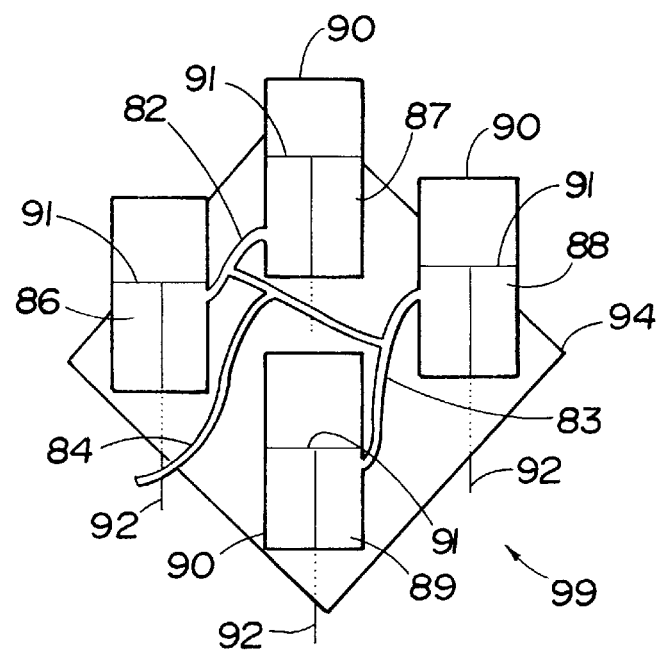
Figure 19A:
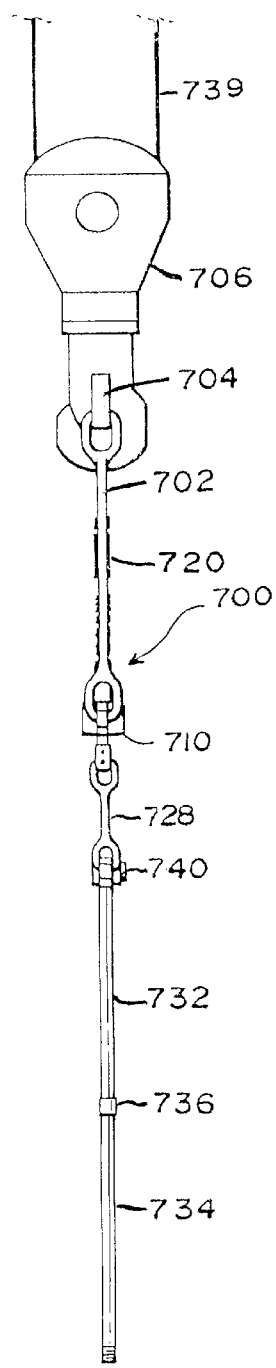
FIG. 19A is a side view of a system according to the present invention.
Figure 19B:
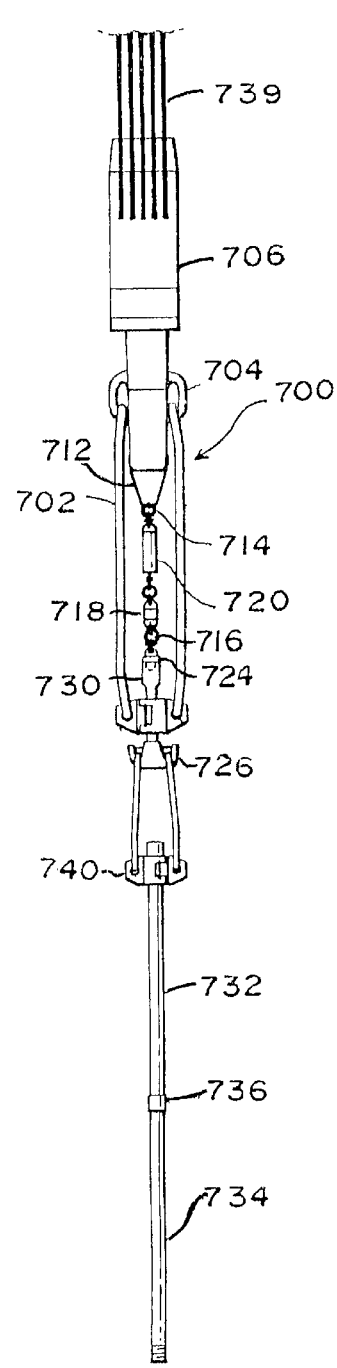
FIGS. 19B and 19C are views of another side of the system of FIG. 19A.
Figure 19C:
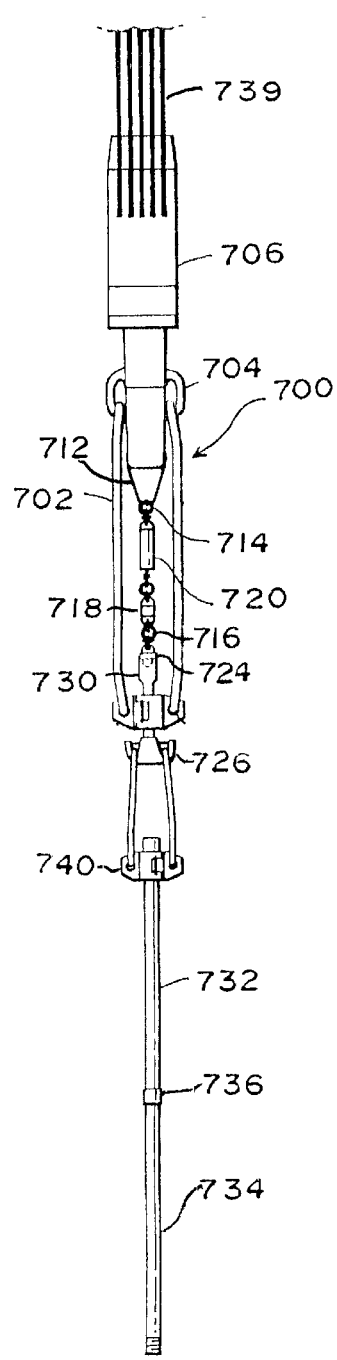

The use of interconnected modules of cylinders in fluid communication via intercommunicating flow lines is shown in a system 99 in FIG. 15G in which lines 82 and 83 each connect two lower cylinder interiors 86, 87 and 88, 89 respectively of cylinders 90, and a line 84 interconnects the two lines 82 and 83. The line 84 extends down to control apparatus (not shown). Pistons 91 are connected to rods 92 a portion of which extends below a plate 94 on which the multiple cylinders are mounted. An upper plate may be used for stability to which each cylinder is also secured. Alternatively a single fluid hose to which all cylinders are connected via a manifold (not shown) allows uniform travel control of the multiple cylinders. The manifold may have an isolation valve for each cylinder for selectively venting each cylinder. The cylinders may also be enclosed in a module housing (e.g., housing H, FIG. 15E). A system 99 may be mounted on a single skid for easy transportation.

FIGS. 16A–16C show one embodiment of a fluid control console 70 for use with the system of FIG. 15A that includes a fluid hose reel 72 on a base 74, a make-up pressure indicator 71, a break-out pressure indicator 73, a make-up regulator pressure control know 75, a make-up relief valve control knob 77, and a break-out regulator pressure control knob 79.

Alternatively (as compared to the system shown in FIG. 13A), the lower ends of the rods 25 may be connected directly to a yoke (e.g. yoke 27) from which a string or primary elevator (e.g. elevator 29) is suspended or a bearing elevator as disclosed herein.

In one typical operation of the system 10 a driller lowers the traveling block with the lifting elevator of the system 10 suspended below it to the height of an upper joint (e.g. of a 3-joint stand) that is to be raised prior to connection to a top stationary joint of a tubular string resting in slips in a derrick rig floor. The driller moves the string or primary elevator towards a derrickman for latching of the elevator 29 around the upper end of the top joint of the 3-joint stand. If the opening of the string elevator is not oriented to admit the upper joint, a derrick hand may operate one or two control valves to first release the brake 50, rotate the stem 11 and elevator 29 and reapply the brake 50. With the elevator 29 oriented correctly to the upper joint, the derrick hand places the upper joint of the stand in the elevator and closes the elevator door.

The driller raises the rig travelling block with the compensator system 10, elevator and stand after the derrickman releases the brake. The stand is then positioned over a top stationary joint of the joint string ready for connection. The stand is then rotated (e.g., by a tong or tongs and/or by the motor of the compensator system) to make-up the joint between the two tubulars. During the joining operation the compensator system limits weight transfer to the stationary joint of the joint string.

After the stand is connected to the joint string, the driller picks up the travelling block and the slips on the joint string are released. The driller then lowers the travelling block to lower the entire string.

To remove a stand of joints from the joint string, the derrickman insures the brake is released, so that stand may be rotated. The elevator stays on the upper joint of the stand during rotation. When the stand has been unscrewed from the joint string, the compensator system strokes up to compensate for the weight of the stand and makes it possible for the stand (and elevator if necessary) to rotate freely. Once the stand is completely removed from the lower joint, the stand is placed in the derrick. The derrickman opens the string or primary elevator and puts the upper joint of the stand into a fingerboard. The driller can then lower the block and pick up the joint string to continue to remove joints or a stand of joints.

FIGS. 17A–17H show a typical make-up operation using a compensator 10 (as in FIGS. 13A). As shown in FIG. 17A, a lower elevator 29 of the compensator 10 has been latched onto a top end of a first Joint 1 which is part of a two joint stand that includes a Joint 2 threadedly connected to the Joint 1. It is within the scope of this invention to use compensators and systems disclosed herein with joints or tubulars connected or secured together other than with threaded ends, e.g., but not limited to joints that are welded together or amorphously bonded together. The drawworks DW of a rig RG have been activated and the compensator system 10, movably secured to a travelling block TB that is connected to a crown block CB in the rig, is compensating for the weight of the two joint stand including Joints 1 and 2.

Initially the cylinders of the compensator 10 are set, i.e. pressurized with fluid, controlled by a compensator control CC (shown schematically in FIG. 17A with lines going to the compensator 10) like the controls and control systems described previously herein. The cylinders have pressure applied to their pistons so that the stand's weight is balanced or substantially balanced and, therefore, the weight of the stand is not apparent to the operator and not imposed on apparatus below the system. The system can be pressurized for the lifting of stands with more joints, e.g. three, four or more, and/or stands with heavier joints.

As shown in FIG. 17B, the stand has been lifted into an initial position above slips SP (see FIG. 17C) on a rig floor. (The drawworks, crown block, rig. compensator control, cable CS etc. shown schematically in FIG. 17A, though present, are not shown in FIGS. 17B–17E).

As shown in FIG. 17C, the travelling block has been lowered and the stand of Joints 1 and 2 has been lowered so that the lower end of Joint 2 has been stabbed into the upper end of a Joint 3 which is the top joint of a string ST extending down in a wellbore WL beneath the rig. The Joint 3 is held in the slips SP. As shown in FIG. 17D, the top stop member 54 of the stem 11 is still spaced apart from the top plate 15, i.e., the elevator 29 and remainder of the system 10 from the pistons down supports the weight of the stand of Joints 1 and 2. A tong TG hangs in the rig for turning the joints for make-up (and break-out operations). Any known suitable tong system may be used with any known suitable backup tong, if desired. A manual tong or tongs may be used.

As shown in FIGS. 17E and 17F, the Joint 2 has been connected to the Joint 3 and as the make-up operation has commenced the pistons in the compensator's cylinders have moved down, creating a rise in pressure in the cylinders and in the lines going to the compensator control CC. The pressure increase is vented via a relief valve in the compensator control CC. During make-up the compensator system 10 compensates for the weight of the stand of Joints 1 and 2 so this weight does not rest on the threads of the Joint 3.

As shown in FIG. 17F, the top stop member 54 of the stem 11 has moved down but does not yet rest on the top plate 15.

As shown in FIGS. 17G and 17H, the slips SP have been released from the Joint 3 and the top stop member 54 of the stem 11 has moved to rest on the top plate 15 so that the cylinders no longer support the weight of the joints and the elevators and stem do support the weight. The compensator cylinders and pistons are thus isolated from the weight of the string ST. The string is now lowered into the wellbore WL so that the top end of Joint 1 can be held by the slips SP and the operation may be repeated to add additional joints and/or stands of joints.

It is seen, therefore, that at least in certain preferred embodiments, the present invention discloses and provides a compensator system for compensating for the weight of at least one joint, the joint comprising a wellbore tubular member, the at least one joint to be supported above at least one stationary joint, the compensator system having a lifting (e.g. string or primary) elevator having a bore therethrough, the bore having a top and a bottom, a stem extending through the bore, the stem having a top end projecting above and out from the top of the bore and a bottom end projecting below and out from the bottom of the bore, at least one compensation cylinder with a top and a bottom, the top connected to the lifting elevator, the at least one compensation cylinder for compensating for weight of the at least one joint, and a joint elevator for receiving and supporting the at least one joint and for releasable connection thereto, the bottom of the at least one compensation cylinder interconnected with the joint elevator, the joint elevator connectible to at least one joint to be lifted; such a system wherein the stem extends rotatably through the bore of the lifting elevator; such a system with bushing apparatus about the bore for facilitating rotation of the stem in the bore; any such system which is able to support the at least one joint and the stationary joint, and in certain aspects, an entire tubular string extending down into a wellbore in the earth; any such system wherein the stationary joint is a top joint of a string of interconnected joints extending down from a rig into a wellbore from an earth surface to a point below the earth surface and, upon connection of the at least one joint to the stationary joint and the compensator system is able to support the at least one joint and the string of interconnected joints; any such system wherein the compensator system is connected to and below a travelling block system in a rig (or other apparatus, hook, swivel, etc. in a rig) and the string of interconnected joints is liftable by and below the travelling block system after connection of the at least one joint to the stationary joint with the joint elevator still connected to the at least one joint; any such system wherein the at least one compensator cylinder has a hollow body, a movable piston mounted in the hollow body, an amount of fluid in the hollow body, the piston movable to compress the amount of fluid, and a piston rod with a top end and a bottom end, the bottom end projecting out from the housing for interconnection with the joint elevator; any such system wherein the bottom end of the piston rod is connected to a yoke to which the bottom end of the stem is connected and from which the joint elevator is suspended; any such system wherein the at least one compensator cylinder has a hollow body, a movable piston mounted in the hollow body, an amount of fluid in the hollow body, the piston movable to compress the amount of fluid, and a piston rod with a top end and a bottom end, the bottom end projecting out from the housing and wherein the bottom of the piston rod is connected to a support plate and a hole therethrough through which the stem rotatably extends and the stem is connected to a yoke from which the joint elevator is releasably extended; any such system wherein the lifting elevator has a top plate and a bottom plate spaced apart from the top plate, each plate having a hole therethrough comprising part of the bore through the lifting elevator, the top of the at least one compensator cylinder connected to a lower surface of the top plate; any such system with a motor on the support plate for contacting and rotating the stem; any such system with a shield for shielding the motor; any such system braking means on the support plate for selectively braking the stem; any such system with a stop plate or stop device or protrusion on the stem above the support plate, a stop member on the support plate (a separate member or part of the support plate itself), the stop plate movable with the stem to abut the stop member to prevent further downward movement of the stem, while the stem is still rotatable with respect to the support plate; any such system wherein the string of interconnected joints weigh at least 50,000; 75,000; 100,000, 150,000 pounds, or more; any such system wherein the string of interconnected joints weigh at least 1,000,000 pounds; any such system wherein the fluid of the amount of fluid is gas or is liquid; any such system wherein the fluid of the amount of fluid is air; any such system wherein the at least one compensating cylinder is four cylinders, each cylinder has a hollow body, a movable piston mounted in the hollow body, an amount of fluid in the hollow body, the piston movable to compress the amount of fluid, and a piston rod with a top end and a bottom end, the bottom end projecting out from the housing for interconnection with the joint elevator, and the fluid of the amount of fluid is air; any such system with bearing apparatus (in one aspect having a plurality of rotatable roller cone bearings or other known suitable bearings) on the support plate disposed about the stem for facilitating rotation of the stem.

In certain aspects, the present invention discloses and provides a method for compensating for weight of at least one movable joint to be connected to and above a stationary joint, the at least one movable joint comprising a wellbore tubular member, the method including securing a joint elevator to the at least one movable joint, the joint elevator part of a compensator system, the compensator system comprising a lifting elevator having a bore therethrough, the bore having a top and a bottom, a stem extending through the bore, the stem having a top end projecting above and out from the top of the bore and a bottom end projecting below and out from the bottom of the bore, at least one compensation cylinder with a top and a bottom, the top connected to the lifting elevator, the at least one compensation cylinder for compensating for weight of the at least one joint, a joint elevator for receiving and supporting the at least one joint and for releasable connection thereto, the bottom of the at least one compensation cylinder interconnected with the joint elevator, the joint elevator connectible to at least one joint to be lifted, and lifting the compensator system with the at least one movable joint secured in the joint elevator, the at least one compensation cylinder compensating for the weight of the at least one movable joint. The present invention also discloses and provides any such method and any method disclosed herein that uses any system disclosed in the preceding paragraph and/or any system disclosed and/or claimed herein.

FIGS. 18A–18C show an elevator 600 according to the present invention with a body 601 with parts 611 and 612 hinged together by hinge 613 for selective emplacement around and removal from a tubular, releasable locking apparatus 620, a bore 608 through the body, lifting ears 602 on the body, a shoulder 603 around the top of the bore 608, and a roller bearing apparatus 604 with halves 614 and 615 on the shoulder 603 each with a plurality of roller bearings 605. A collar or other appropriate part of a tubular (not shown) may rest and move on the roller bearings 605 and thus rotation of the collar (and of, therefore, the tubular and other tubulars connected to and beneath it) is facilitated. Any elevator disclosed herein may have such roller bearing apparatus or, alternatively, any suitable known roller and/or bearing devices or mechanisms may be used on the shoulder 603 or on a top portion of the elevator. Such bearing and/or roller apparatus may also be provided for multiple (dual, quad, etc.) string elevators.

FIGS. 19A–19E disclose a wellbore tubular compensating system 700 according to the present invention. Main bails 702 suspended from the lift eyes 704 of a rig's travelling block 706 have lower ends 708 extending through lift eyes of an upper elevator 710. Typical cables 739 support the travelling block 706 in a rig (not shown).

Slings 712, made e.g. of steel or synthetic cables, are connected at their top ends to a lower end of the travelling block 706 and at their bottom ends to a lift eye 714 of a joint compensator 720 (which may be any known joint compensator, air cylinder compensator, hydraulic cylinder compensator, or air spring compensator, including any device for joint compensation disclosed herein.

An optional swivel 718 has its top end connected to a lower eye 722 of the joint compensator 720 and its bottom end connected to a shackle 716 which itself is connected to a top end of a sub 724. The sub 724 is threadedly connected to a standard, commercially available lift assembly 730 which has a lower hook end 726 to which are releasably connected links 728. A lower elevator 740 is connected to the lower ends of the links 728.

Both the elevators 710 and 740 may be any suitable known elevator and any elevator disclosed herein. As shown each elevator is a hinged-door type elevator which is openable to receive a tubular and closable and latchable for holding a tubular. Slip-type elevators may be used. A stand 736 of two tubular joints 732 and 734 is held by the elevator 740 and supported by the system 700. Although two tubular joints are shown, it is to be understood that the system 700 can support one or a plurality of two, three, four or more joints, including an entire tubular string extending down into a wellbore.

FIGS. 19D and 19E illustrate steps in the support and handling of the tubular stand 736. The joint compensator 720 has various fluid lines, etc. and control apparatus as previously described herein. Initially, the elevator 740 is latched onto a new stand of tubulars. With the travelling block 706, the stand is lifted to a vertical position. At this point, a shoulder 738 of a shaft 742 of the assembly 730 is bottomed out on a corresponding shoulder 744 of a bowl 746 of the elevator 710. The compensator 720 is then activated to compensate for the weight of the stand, raising the shaft 742 so that the elevator 710 no longer supports the stand, as shown in FIG. 19D.

While the stand's weight is compensated for by the compensator 720, the stand is easily manipulable and its lower end is positioned above and then lowered into a top joint of a tubular string being supported by the rig's slips on the rig floor. As the stand is made up into the string, the compensator 720 permits the compensated lowering of the stand. When the joint is made up, the rig slips are released; the travelling block system raises the system 700; the shoulder 738 bottoms out on the bowl's shoulder 744 (see FIG. 19E); and then the rig's system supports and lowers the entire string. Again the rig slips are set; the elevator 740 is released; and the process of adding an additional stand begins again. A reverse process is used for break-out operations, with the joint compensator 720 activated prior to or following initial lifting up on the string and setting of the rig's slips. As a joint is unscrewed and rising, the joint compensator 720 compensates for the weight of the joint.

Figure 20:
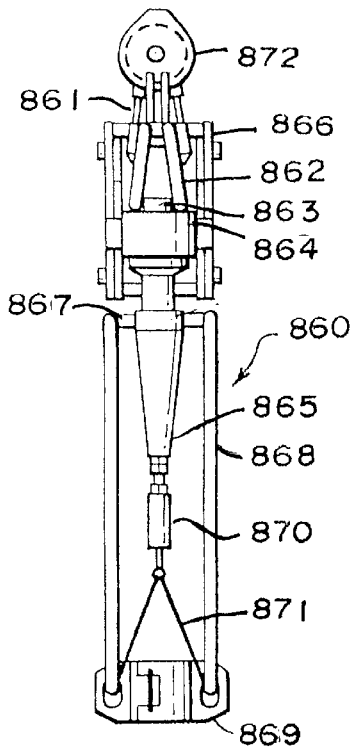
FIGS. 20A and 20C are side views of a system according to the present invention.
FIG. 20B shows an enlargement of part of the system of FIG. 20A.
FIG. 20D shows an enlargement of part of the system of FIG. 20C.
FIGS. 20E and 20F are side views of a system according to the present invention.
FIG. 20G is another side of the system of FIG. 20E.
FIG. 20H is a side view of a system according to the present invention.
FIG. 20I is a side cross-section view showing an embodiment of the system of FIG. 20H.
Figure 20:
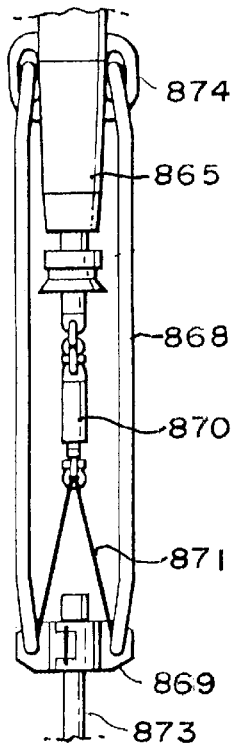

FIGS. 20A–20D shows a system 750 according to the present invention with some parts that are like those of the system 700 and which bear the same identifying numerals. Slings 752 through the eyes 704 connect the tops of joint compensators 751 to the eyes 704. Clamps 753 releasably clamp the lower ends of the joint compensators 751 to the bails 702. Shackles 754 provide for pivoting of the joint compensators 751. As shown in FIG. 20B, an upper part 755 of the tubular 732 is resting on rollers (one shown) 757 rotatably mounted to the elevator 740's body. The rollers 757 are like the rollers in FIG. 21A. As shown in FIG. 20D, the rollers 757 have been moved down, compressing compression members (not shown, see FIGS. 21A, 23). As shown in FIG. 20A, the joint compensators 751 are compensating for the weight of the tubulars 732, 734; and the top shackles of the bails 702 are riding up in the eyes 704. The eyes 704 are not at this point bearing the weight through the entire length of the bails 702 of the system 750 and the tubulars 732, 734. As shown in FIG. 20D, the elevator 740, bails 702 and eyes 704 are bearing this weight and the joint compensators are not compensating for the weight of the tubulars. Typical control lines and control apparatus (not shown) are used with the compensators 751.

FIGS. 20E–20G show a system 850 according to the present invention with the travelling block 706 with the cables 739 supporting the system 850 in a rig derrick (not shown). The bails 702 support the elevator 740 which holds the tubulars 732, 734 (all as in FIG. 19A previously described). Slings 852 support joint compensator 851 below the travelling block 706 and slings 853 connect the joint compensator 851 to the elevator 740 so that the joint compensator (as shown in FIG. 20E) compensates for the weight of tubulars held by the elevator 740. FIG. 20F shows the eyes 704, bails 702 and elevator 740 supporting the tubulars 732, 734 (and whatever may be connected thereto). The joint compensator may be any compensator disclosed herein (as may be the compensator 870, FIG. 20H). Typical control lines and control apparatus are used with the joint compensator 854 (and the compensators 851, 870) or such lines and apparatus as disclosed herein (as is the case for any compensator in FIGS. 19A, 20A, 20E, and 20H).

FIG. 20H shows a top drive system 860 according to the present invention suspended below a travelling block 872 with eyes 862 to which are connected a swivel 863, a power train 864 and a top drive 865. A guide dolly 866 holds and guides the top drive (td). Lift eyes 867 connected to the top drive support bails 868 which support a lower elevator 869 (like the elevator 740). A joint compensator 870 is connected to a lower end of a lift sub 872 which is connected to the top drive 865 and slings 871 interconnect the lower elevator 869 and the joint compensator 870.

FIG. 20I shows an embodiment of the system 860 compensating for the weight of a tubular 873 (or a tubular string including the tubular 873). The embodiment of FIG. 20I has an elevator 874 instead of the lift eyes 867 of FIG. 20H.

Figure 21:
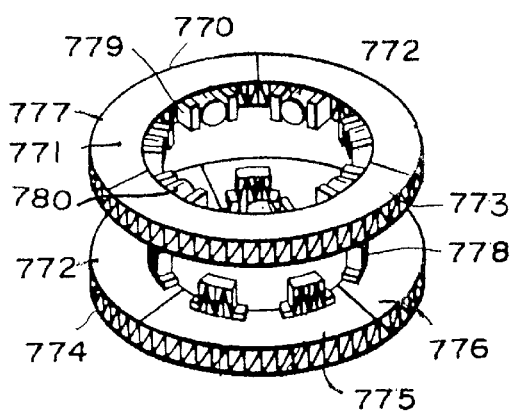
FIG. 21A is a top perspective view of a roller system according to the present invention.
FIG. 21B is a top perspective view of the system of FIG. 21A.
Figure 21:
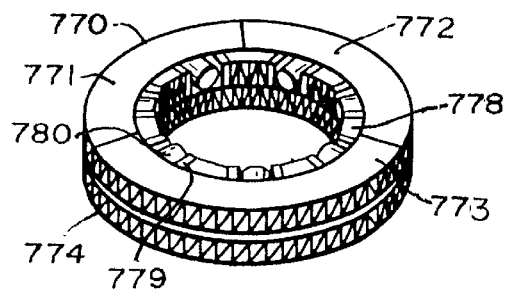

FIGS. 21A and 21B show a roller bearing assembly 770 with segments 771, 772, and 773 which are insertable into an elevator (e.g. like the elevator 600, FIG. 18A) to facilitate rotation of a tubular with respect to the elevator. A plurality of rollers 780 are rotatably mounted to the segments 771, 772, and 773. Arms 779 extends inwardly on each side of each roller 780. A base member 774 disposed beneath the roller bearing assembly 770 has three segments 775, 776, and 777 each with two or three upwardly projecting supports 778. In operation a tubular disposed in the bearing assembly 770 is initially supported by the rollers 780. As the tubular is lowered or elevator is raised weight applied to the rollers increases, pushing the segments 771–773 down, and thereby arms 779 compress compressible members 799 adjacent each support 778. Eventually the supports 778 (see FIG. 21B) project up beyond the top of the rollers 780 and bear the weight of the tubular and other tubulars, if any, attached to it. The compressible members 799 may be made of any suitable compressible and/or cushion material, including, but not limited to elastic materials, rubber, elastomeric materials, and/or a spring or springs of suitable spring force, and/or vented gas filled bladders (in one aspect which are selectively refillable) and/or any combination thereof. Alternatively, no compressible members are used in the system of FIG. 21A (or of FIG. 23).

Figure 22:
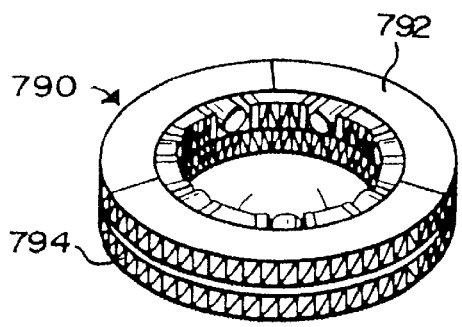
FIG. 22 is a is a top perspective view of a roller system according to the present invention.

Instead of three segments the bearing assembly and/or base may be made of two, four or more segments. As shown in FIG. 22, an assembly 790 according to the present invention has a bearing assembly 792 and a base 794 which are not segmented.

Bearing assemblies as in FIGS. 18C, 21A and 22 may be used in any suitable tubular handling apparatus or device, including, but not limited to, pipe handlers, pipe positioners, elevators, spiders, and tongs.

Figure 23:
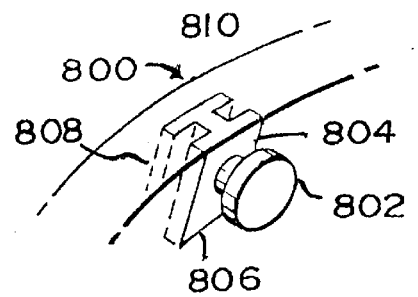
FIG. 23 is a perspective view of a roller system according to the present invention.

FIG. 23 illustrates a particular embodiment of a bearing system 800 with a plurality of rollers 802 (one shown) useful in assemblies as in FIGS. 21A and FIG. 22, and in the roller bearing apparatus 604, FIG. 18C. Each roller 802 is rotatably mounted to a support 804 which is disposed above a compressible member (or material) 806. The support 804 is releasably disposed in a slot 808 in an elevator body 810. Each support 804 may be held in place with one or more set screws and/or bolts. Such a system may be used in any item listed (pipe handlers, etc.) in the preceding paragraph.

Figure 24A:
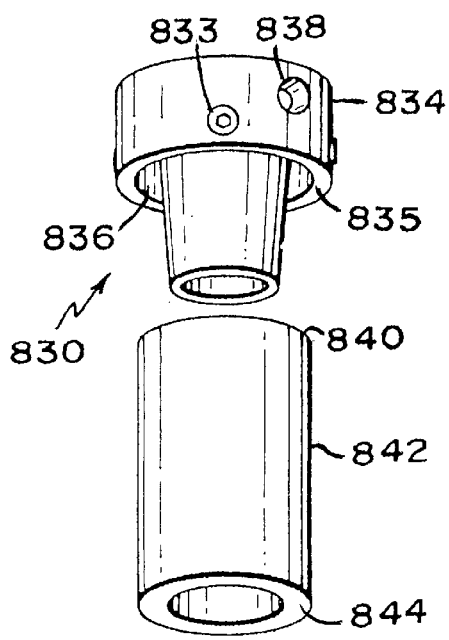
FIG. 24A shows a lifting cap according to the present invention above a tubular.
Figure 24B:
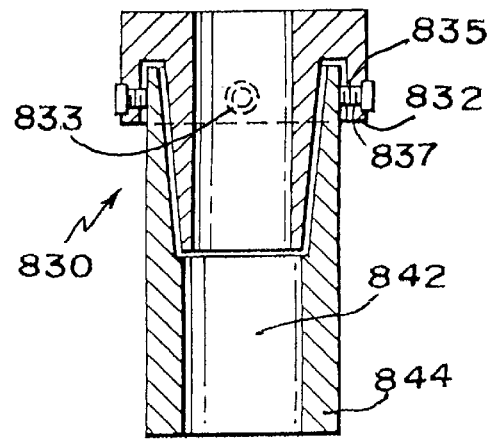
FIG. 24B is a side cross-section view of the cap of FIG. 24A.
Figure 24C:
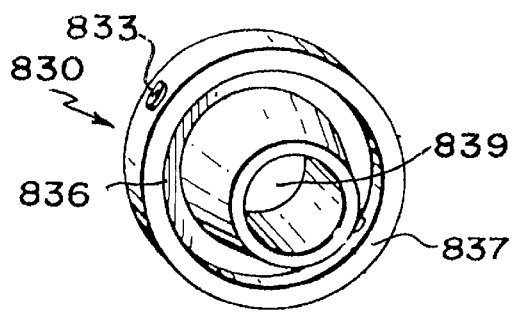
FIG. 24C is a bottom perspective view of the cap of FIG. 24A showing the central opening and channel through the cap from top to bottom.

FIGS. 24A and 24B illustrate a lift cap 830 for use with various wellbore tubulars for providing a support surface 832 which can rest on a bearing assembly (as, e.g. in FIGS. 21A, 22, and 18C). The lift cap 830 has a generally cylindrical body 834 with a threaded end 835 threadedly engageable on a threaded end 840 of a tubular 842 (FIG. 24B). The wall 844 of the tubular 842 is received in a recess 836 around the cap's body 834. Lift/rotation holes 838 (one of two shown in FIG. 24A) facilitate lifting and rotation of the cap 830. Set screws 833 through holes 837 secure the cap 830 to the tubular 840 to prevent unwanted unscrewing of the two. FIG. 24C shows a central channel 839 through the lift cap 830.

Figure 25A:
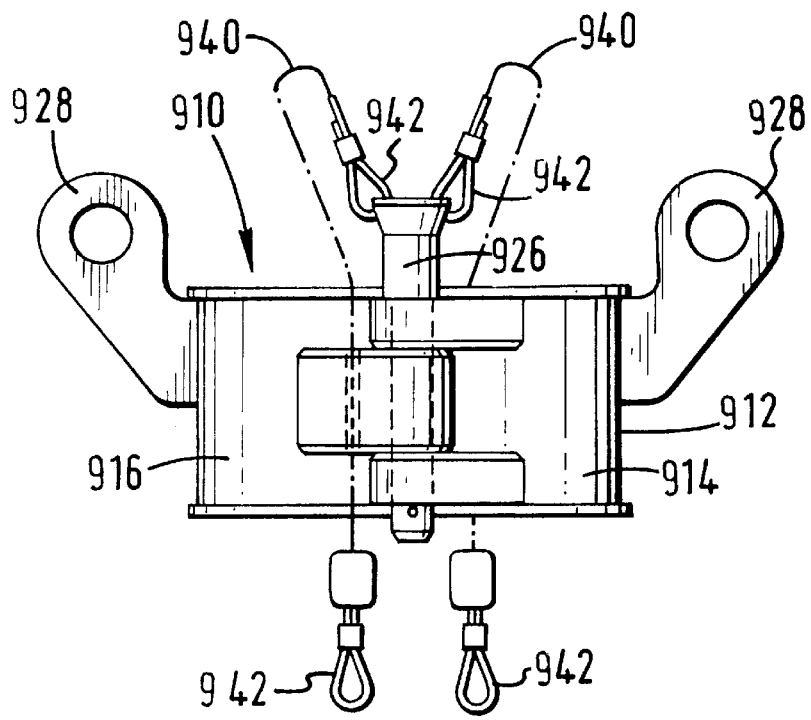
FIG. 25A is a side view of an elevator according to the present invention.
Figure 25B:
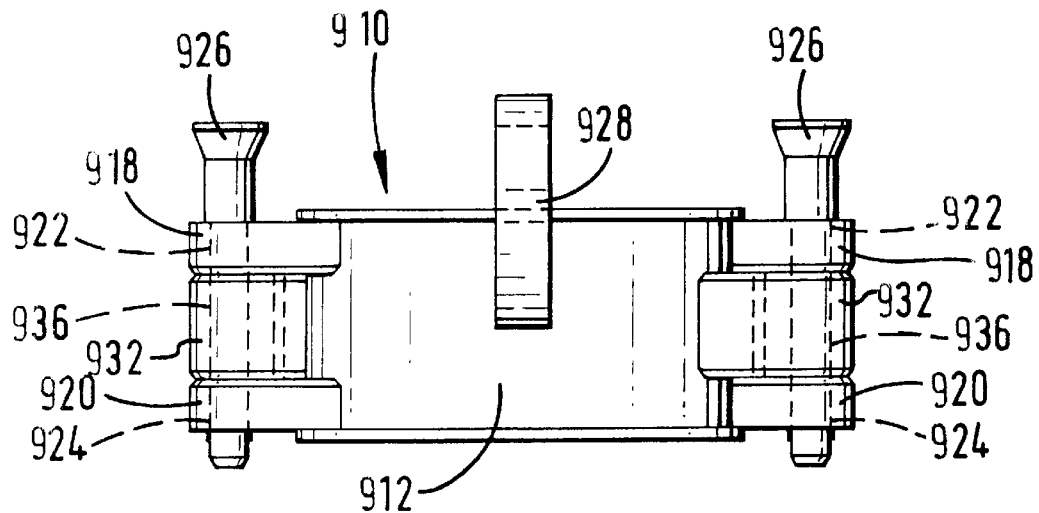
FIG. 25B is a side view from another side of the elevator of FIG. 25A.

Referring now to FIGS. 25A–25C, an elevator 910 according to the present invention has a body 912 with two parts 914 and 916 which are dually hinged together. Each part has bosses 918 and 920, respectively, with channels 922 and 924 therethrough, and bosses 932 and 934, respectively, with channels 936 therethrough through which are removably inserted pins 926. Lifting ears 928 are on each side of the body 912. Thus the elevator may be selectively opened from either side as desired. Elastic straps or cables or wires

19

940 with connectors 942 are connected to each pin 926 may be used to move the elevator and/or to move the pins 926. A tubular resides in an opening 938 defined between inner surfaces of the two parts 914 and 916.

As shown in FIG. 26, in one aspect an elevator according to the present invention may have rollers 946 rotatably mounted to a part of the body 912 to facilitate tubular movement of a tubular 948 with respect to the elevator.

Figure 27:
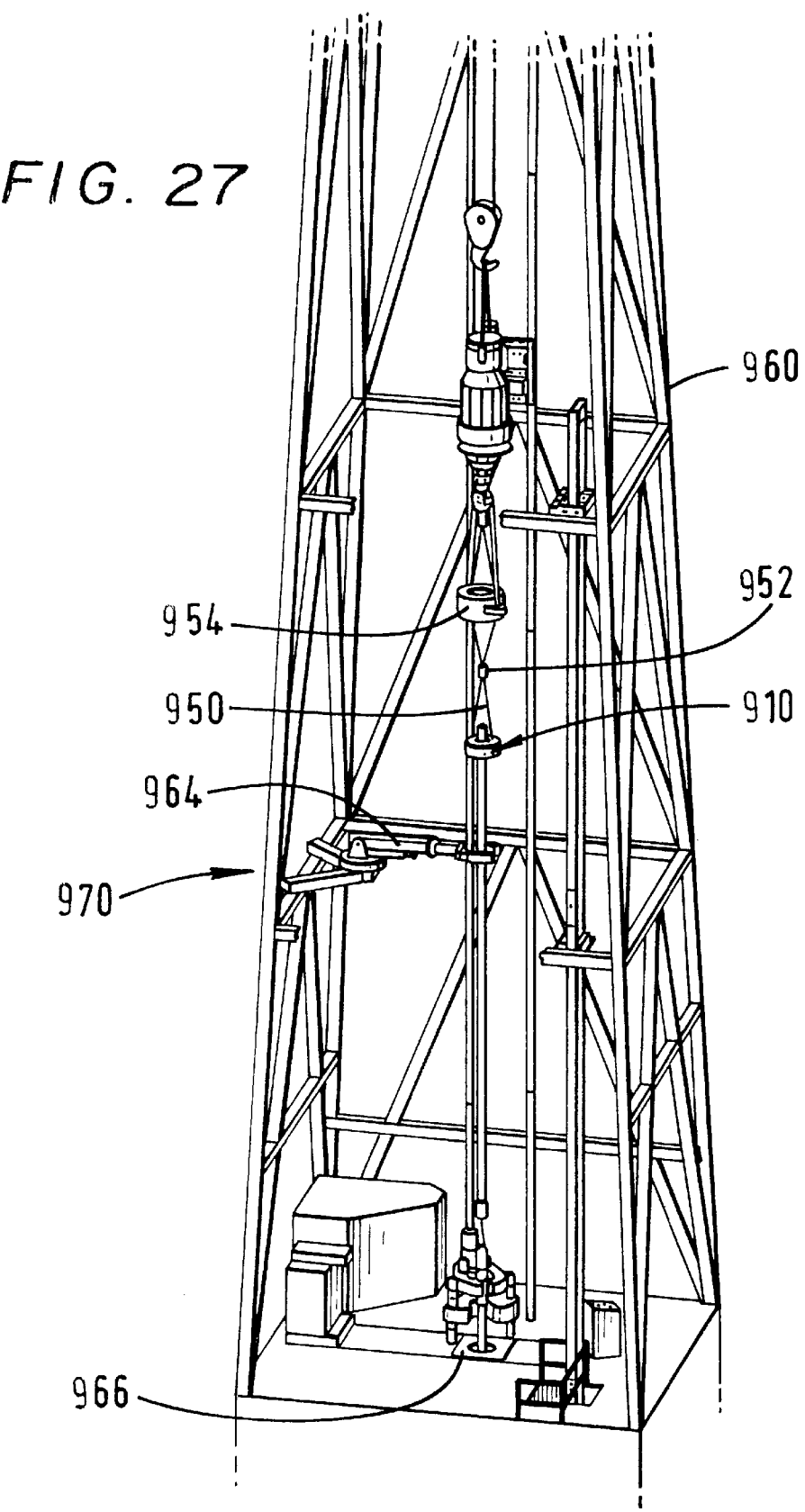
FIG. 27 is a perspective view of a system according to the present invention.

Referring now to FIG. 27, an elevator 910 is shown positioned in a rig 960 with elastic straps 950 connecting the elevator 910 to a swivel 952 and with straps 954 connecting the swivel 952 to a string elevator 956. A system 970 as shown in FIG. 27 according to the present invention includes a mechanized stabbing device 964 secured to the rig 960 and a remote controlled spider 966 with a safety interlock system.

The present invention, therefore, provides an elevator for use in wellbore operations which a has first body part, a second body part, the body parts together defining an interior opening through the elevator for accommodating a wellbore tubular therein, first hinge apparatus hingedly connecting the two body parts together and permitting the two body parts to be hingedly openable on a first side of the elevator, and second hinge apparatus disposed across from the first hinge apparatus, the second hinge apparatus hingedly connecting the two body parts together and permitting the two body parts to be hingedly openable on a second side of the elevator; such an elevator with at least one roller secured to an interior of at least one of the body parts to facilitate movement of a wellbore tubular with respect to the elevator; such an elevator wherein the at least one roller is a plurality of spaced apart rollers; and such an elevator with a plurality of one or more rollers on each body part.

The present invention therefore, in certain aspects, provides a compensator system for compensating for the weight of at least one joint, the at least one joint comprising a wellbore tubular member, the compensating system for use below a wellbore apparatus (e.g., but not limited to, a block in a derrick or a top drive), the wellbore apparatus for supporting the at least one joint, the compensation system having a joint compensator (e.g. any known compensator or any disclosed herein) suspended below the wellbore apparatus and connected thereto for selectively compensating for the weight of the at least one joint, a lower elevator suspended below and interconnected with the joint compensator for releasably holding the at least one joint, and a wellbore elevator connected to the wellbore apparatus for selectively supporting the joint compensator and the at least one joint; such a system with a connection member, tubular, pipe or sub having a top connected to and below the joint compensator, a mid portion extending through the wellbore elevator, and a bottom portion, and the lower elevator suspended below and connected to the bottom portion of the connection sub; such a system wherein the wellbore apparatus is a top drive system and connectors connect the joint compensator to the lower elevator; such a system wherein the connection member has a shoulder so that the wellbore elevator supports the connection member, the lower elevator, and the at least one joint when the shoulder rests on the wellbore elevator; such a system wherein the at least one joint is a plurality of interconnected wellbore tubular members; such a system wherein the plurality of interconnected wellbore tubular members includes members in a wellbore in the earth; such a system with bails connected to the connection sub and to the lower elevator for suspending the lower elevator from the connection sub; such a system with a swivel connected to and between the joint compensator

20 and the connection sub; such a system wherein the connection sub is a lifting sub or lift assembly; such a system wherein the wellbore elevator has an interior channel therethrough and at least one roller mounted thereon to facilitate movement of the at least one joint with respect to the wellbore elevator; such a system wherein the at least one roller is mounted above a compressible member compressible in response to weight of the at least one joint on the at least one roller; such a system wherein the at least one roller is a plurality of spaced-apart rollers; such a system with two bails including a first bail and a second bail suspending the wellbore elevator to the wellbore apparatus, the joint compensator comprising a first joint compensator having a top end connected to the wellbore apparatus and a bottom end secured to the first bail, a second joint compensator having a top end connected to the wellbore apparatus and a bottom end secured to the second bail, the joint compensators for selectively compensating for the weight of the at least one joint.

The present invention discloses, in certain aspects, methods for compensating for weight of a wellbore tubular member or members, the method employing any joint compensator disclosed herein and, in one aspect, including holding at least one joint or a plurality thereof with a lower elevator of a compensator system as disclosed herein and compensating with the joint compensator for the weight of the at least one joint.

The present invention discloses a wellbore elevator with an elevator body with a channel therethrough for accommodating a wellbore tubular supported by the elevator, at least one roller on the elevator body for facilitating movement of the wellbore tubular with respect to the elevator body, and (in certain embodiments) a compressible member (e.g. material and/or springs) below the at least one roller, the compressible member compressible in response to weight of the wellbore tubular on the at least one roller.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112.

What is claimed is:

1. A compensator system for compensating for a weight of at least one joint, the at least one joint comprising a wellbore tubular member, the compensating system for use below a wellbore apparatus, the wellbore apparatus for supporting the at least one joint, the compensation system comprising a joint compensator suspended below the wellbore apparatus and connected thereto for selectively compensating for the weight of the at least one joint, a lower elevator suspended below and interconnected with the joint compensator for releasably holding the at least one joint, a wellbore elevator connected to the wellbore apparatus for selectively supporting the joint compensator and the at least one joint, a connection sub having a top connected to and below the joint compensator, a mid portion extending through the wellbore elevator, and a bottom portion, and the lower elevator suspended below and connected to the bottom portion of the connection sub.

2. The compensator system of claim 1 wherein the wellbore apparatus is a rig travelling block.

3. The compensator system of claim 1 wherein the wellbore apparatus is a top drive system and connectors connect the joint compensator to the lower elevator.

4. The compensator system of claim 1 wherein the connection sub has a shoulder so that the wellbore elevator supports the connection sub, the lower elevator, and the at least one joint when the shoulder rests on the wellbore elevator.

5. The compensator system of claim 1 wherein the at least one joint is a plurality of interconnected wellbore tubular members.

6. The compensator system of claim 1 wherein the plurality of interconnected wellbore tubular members includes members in a wellbore in the earth.

7. The compensation system of claim 1 further comprising bails connected to the connection sub and to the lower elevator for suspending the lower elevator from the connection sub.

8. The compensation system of claim 1 further comprising a swivel connected to and between the joint compensator and the connection sub.

9. The compensation system of claim 1 wherein the connection sub is a lifting sub.

10. The compensation system of claim 1 wherein the wellbore elevator has an interior channel therethrough and at least one roller mounted thereon to facilitate movement of the at least one joint with respect to the wellbore elevator.

11. The compensator system of claim 10 wherein the at least one roller is mounted above a compressible member compressible in response to weight of the at least one joint on the at least one roller.

12. The compensator system of claim 10 wherein the at least one roller is a plurality of spaced-apart rollers.

13. The compensator system of claim 1 further comprising two bails including a first bail and a second bail suspending the wellbore elevator to the wellbore apparatus, the joint compensator comprising a first joint compensator having a top end connected to the wellbore apparatus and a bottom end secured to the first bail, a second joint compensator having a top end connected to the wellbore apparatus and a bottom end secured to the second bail, the joint compensators for selectively compensating for the weight of the at least one joint.

14. A method for compensating for weight of a wellbore tubular member, the method comprising holding at least one joint with a lower elevator of a compensator system, the compensator system comprising a joint compensator suspended below the wellbore apparatus and connected thereto for selectively compensating for the weight of the at least one joint, a lower elevator suspended below and interconnected with the joint compensator for releasably holding the at least one joint, and a wellbore elevator connected to the wellbore apparatus for selectively supporting the joint compensator and the at least one joint, and a connection sub having a top connected to and below the joint compensator, a mid portion extending through the wellbore elevator, and a bottom portion, and the lower elevator suspended below and connected to the bottom portion of the connection sub, and compensating with the joint compensator for the weight of the at least one joint.

15. The method of claim 14 wherein the wellbore apparatus is a rig travelling block, the method further comprising selectively supporting the at least one joint with the wellbore apparatus.

16. The method of claim 14 wherein the wellbore apparatus is a top drive system and connectors connect the joint compensator to the lower elevator.

17. The method of claim 14 wherein the at least one joint is a plurality of interconnected joints.

18. The method of claim 15 wherein the at least one joint is a plurality of interconnected joints.

19. A compensator system for compensating for a weight of at least one joint, the at least one joint comprising a wellbore tubular member, the compensating system for use below a wellbore apparatus, the wellbore apparatus for supporting the at least one joint, the compensation system comprising a joint compensator suspended below the wellbore apparatus and connected thereto for selectively compensating for the weight of the at least one joint, a lower elevator suspended below and interconnected with the joint compensator for releasably holding the at least one joint, a wellbore elevator connected to the wellbore apparatus for selectively supporting the joint compensator and the at least one joint, and a swivel connected to and between the joint compensator and the connection sub.

20. A compensator system for compensating for a weight of at least one joint, the at least one joint comprising a wellbore tubular member, the compensating system for use below a wellbore apparatus, the wellbore apparatus for supporting the at least one joint, the compensation system comprising a joint compensator suspended below the wellbore apparatus and connected thereto for selectively compensating for the weight of the at least one joint, a lower elevator suspended below and interconnected with the joint compensator for releasably holding the at least one joint, a wellbore elevator connected to the wellbore apparatus for selectively supporting the joint compensator and the at least one joint, wherein the wellbore elevator has an interior channel therethrough and at least one roller mounted thereon to facilitate movement of the at least one joint with respect to the wellbore elevator.

21. The compensator system of claim 20 wherein the at least one roller is mounted above a compressible member compressible in response to weight of the at least one joint on the at least one roller.

22. The compensator system of claim 20 wherein the at least one roller is a plurality of spaced-apart rollers.

23. A compensator system for compensating for a weight of at least one joint, the at least one joint comprising a wellbore tubular member, the compensating system for use below a wellbore apparatus, the wellbore apparatus for supporting the at least one joint, the compensation system comprising a joint compensator suspended below the wellbore apparatus and connected thereto for selectively compensating for the weight of the at least one joint, a lower elevator suspended below and interconnected with the joint compensator for releasably holding the at least one joint, a wellbore elevator connected to the wellbore apparatus for selectively supporting the joint compensator and the at least one joint, two bails including a first bail and a second bail suspending the wellbore elevator to the wellbore apparatus, the joint compensator comprising a first joint compensator having a top end connected to the wellbore apparatus and a bottom end secured to the first bail, a second joint compensator having a top end connected to the wellbore apparatus and a bottom end secured to the second bail, the joint compensators for selectively compensating for the weight of the at least one joint.

* * * * *